US008544159B2

(12) United States Patent
Muhlenkamp et al.

(10) Patent No.: US 8,544,159 B2
(45) Date of Patent: Oct. 1, 2013

(54) METHODS OF MANUFACTURING PARTS USING A MANUFACTURING CELL

(75) Inventors: Rick J. Muhlenkamp, Coldwater, OH (US); David G. Schaefer, Maria Stein, OH (US); Todd A. Thomas, Celina, OH (US); Stephen E. Wagner, St. Marys, OH (US); Joel E. Zacharias, Celina, OH (US)

(73) Assignee: Crown Equipment Corporation, New Bremen, OH (US)

( * ) Notice: Subject to any disclaimer, the term of this patent is extended or adjusted under 35 U.S.C. 154(b) by 49 days.

(21) Appl. No.: 13/347,731

(22) Filed: Jan. 11, 2012

(65) Prior Publication Data

US 2012/0110812 A1 May 10, 2012

Related U.S. Application Data

(62) Division of application No. 11/770,479, filed on Jun. 28, 2007, now Pat. No. 8,108,989.

(51) Int. Cl.
*B23P 11/00* (2006.01)
*B65G 1/00* (2006.01)
*B23Q 7/00* (2006.01)
*H01L 21/677* (2006.01)

(52) U.S. Cl.
USPC ............. 29/431; 29/430; 29/824; 29/771; 29/783; 29/786; 29/799; 29/33 P; 414/800; 414/272; 414/279; 414/222.13

(58) Field of Classification Search
USPC ............. 29/429, 430, 431, 822, 824, 794, 29/771, 783, 786, 799, 711, 712, 33 P; 414/272, 279, 281, 800–816, 222.13; 193/35 R, 193/35 SS, 37; 198/457.02, 539, 589
See application file for complete search history.

(56) References Cited

U.S. PATENT DOCUMENTS

| | | | |
|---|---|---|---|
| 2,227,145 A | 12/1940 | Lex et al. |
| 2,577,926 A | 12/1951 | Stiles |
| 3,093,232 A | 6/1963 | Kornylak |
| 3,107,004 A | 10/1963 | Arndt |
| 3,254,376 A | 6/1966 | Burnett |
| 3,456,776 A | 7/1969 | Viene |
| 3,621,972 A | 11/1971 | Reuter |
| 3,747,189 A | 7/1973 | Kawasaki |
| 3,906,825 A | 9/1975 | Schenck et al. |
| 3,944,054 A | 3/1976 | Ensinger |
| 3,954,170 A | 5/1976 | Schlough |

(Continued)

FOREIGN PATENT DOCUMENTS

JP 05023931 A 2/1993

*Primary Examiner* — Sarang Afzali
(74) *Attorney, Agent, or Firm* — Stevens & Showalter LLP

(57) ABSTRACT

A manufacturing cell has a plurality of stations arranged in two rows having a main aisle therebetween. Each of the plurality of stations has a station-aisle interface that provides an interaction area to the main aisle. The manufacturing cell also comprises a plurality of storage units that are located within the cell along the main aisle and a guided forklift truck that traverses the main aisle without requiring steering control of a stock handler operating the forklift truck within the main aisle to relocate containers from the storage units to designated station-aisle interfaces and to remove containers from the designated station-aisle interfaces when work is completed at the corresponding stations. At least one of the plurality of stations having two conveyors each having a tiltable platform such that each of the two conveyors can be used to receive and return containers.

20 Claims, 19 Drawing Sheets

(56) References Cited

U.S. PATENT DOCUMENTS

| | | |
|---|---|---|
| 4,040,500 A | 8/1977 | Blakeslee |
| 4,043,418 A | 8/1977 | Blakeslee |
| 4,121,084 A | 10/1978 | Wear |
| 4,137,444 A | 1/1979 | Schalch |
| 4,160,151 A | 7/1979 | Tonita |
| RE30,492 E | 1/1981 | Blakeslee |
| 4,397,384 A | 8/1983 | Nohren, Jr. |
| 4,472,783 A | 9/1984 | Johnstone et al. |
| 4,555,010 A | 11/1985 | Solund |
| 4,669,047 A | 5/1987 | Chucta |
| 4,698,766 A | 10/1987 | Entwistle et al. |
| 4,736,812 A | 4/1988 | Livneh |
| 4,811,473 A | 3/1989 | Link |
| 5,007,783 A | 4/1991 | Matsuo |
| 5,008,604 A | 4/1991 | Dammeyer et al. |
| 5,025,126 A | 6/1991 | Hansen |
| 5,030,055 A | 7/1991 | Parks et al. |
| 5,032,994 A | 7/1991 | Wellman |
| 5,068,790 A | 11/1991 | Wellman |
| 5,068,791 A | 11/1991 | Klopfleisch et al. |
| 5,189,624 A | 2/1993 | Barlow et al. |
| 5,258,911 A | 11/1993 | Wellman et al. |
| 5,343,145 A | 8/1994 | Wellman et al. |
| 5,440,480 A | 8/1995 | Costanza |
| 5,775,475 A | 7/1998 | Sardo |
| 6,009,357 A | 12/1999 | Wellman et al. |
| 6,012,891 A | 1/2000 | Timmins |
| 6,227,357 B1 | 5/2001 | Brown, Sr. |
| 6,227,793 B1 | 5/2001 | Knighten |
| 6,233,904 B1 | 5/2001 | Kovacs et al. |
| 6,297,472 B1 | 10/2001 | Bong et al. |
| 6,354,048 B1 | 3/2002 | Gillett et al. |
| 6,390,275 B1 | 5/2002 | Bonnet |
| 6,450,751 B1 | 9/2002 | Hollander |
| 6,468,015 B1 | 10/2002 | Konstant |
| 6,493,930 B1 | 12/2002 | Raami |
| 6,499,207 B1 | 12/2002 | Pigott et al. |
| 6,516,242 B1 | 2/2003 | Brown |
| 6,554,123 B2 | 4/2003 | Bonnet |
| 6,627,016 B2 | 9/2003 | Abare et al. |
| 6,720,529 B2 | 4/2004 | Davidson et al. |
| 6,745,454 B1 | 6/2004 | Grimshaw et al. |
| 6,782,302 B1 | 8/2004 | Barto et al. |
| 6,785,581 B2 | 8/2004 | Mountcastle, III et al. |
| 6,809,510 B2 | 10/2004 | Goetzke |
| 6,993,821 B2 | 2/2006 | Ahti et al. |
| 7,010,373 B2 | 3/2006 | Fukushima et al. |
| 7,027,884 B2 | 4/2006 | Watanabe et al. |
| 7,096,913 B2 | 8/2006 | Ramnauth et al. |
| 7,146,705 B2 | 12/2006 | Ahti et al. |
| 7,162,799 B2 | 1/2007 | Moore et al. |
| 7,387,243 B2 | 6/2008 | Magens et al. |
| 8,108,989 B2 | 2/2012 | Muhlenkamp et al. |
| 2001/0045420 A1 | 11/2001 | Bong et al. |
| 2002/0100158 A1 | 8/2002 | Lak, Sr. et al. |
| 2003/0014314 A1 | 1/2003 | Griep et al. |
| 2003/0041950 A1 | 3/2003 | Wellman et al. |
| 2004/0007140 A1 | 1/2004 | Irri et al. |
| 2004/0045946 A1 | 3/2004 | Davidson et al. |
| 2004/0099372 A1 | 5/2004 | Ramnauth et al. |
| 2004/0213659 A1 | 10/2004 | Lisec |
| 2004/0225390 A1 | 11/2004 | Keller et al. |
| 2005/0095091 A1 | 5/2005 | Fukada |
| 2005/0220594 A1 | 10/2005 | Haag |
| 2005/0257361 A1 | 11/2005 | Ramnauth et al. |
| 2006/0015203 A1 | 1/2006 | Fukushima et al. |
| 2006/0049159 A1 | 3/2006 | Nihei et al. |
| 2006/0054452 A1 | 3/2006 | Marcelli |
| 2006/0108342 A1 | 5/2006 | Samodell et al. |
| 2006/0138116 A1 | 6/2006 | Lipnevicius |
| 2006/0163225 A1 | 7/2006 | Takahashi et al. |
| 2007/0005411 A1 | 1/2007 | Preiss |

METHODS OF MANUFACTURING PARTS USING A MANUFACTURING CELL

This application is a division of U.S. patent application Ser. No. 11/770,479 filed Jun. 28, 2007, now U.S. Pat. No. 8,108,989, entitled MANUFACTURING CELL AND ELEMENTS OF THE CELL, which is incorporated herein in its entirety by reference.

BACKGROUND OF THE INVENTION

The present invention relates in general to manufacturing environments, and in particular, to manufacturing cells for the fabrication, manufacture, processing, assembly and/or subassembly of parts, part assemblies and/or products. The present invention further relates to systems and methods of configuring and utilizing such manufacturing cells.

Modern manufacturing environments, especially those that support multiple, diverse product lines, are constantly challenged with issues including how to accurately forecast demand and how to minimize lead time from start of manufacture until a completed product is ready to be shipped. This is particularly true for manufacturers of products having numerous and/or complex subassemblies.

For example, manufacturers of heavy duty working vehicles, such as forklift trucks, must manufacture and assemble many complex components and component assemblies for each model of vehicle that is offered. Moreover, there is extensive labor and time involved in the manufacture of certain component parts of the vehicles, such as covers, doors, etc., due, at least in part, to the time required to obtain dies, set up jigs, and prepare tools and other necessary specialty items to work on these component parts. Thus, changeover for manufacturing different component parts or from the manufacture of component parts associated with a first product line to component parts associated with a second product line can take considerable time and resources.

Still further, in a manufacturing environment such as for heavy duty working vehicles, station operators may be required to interact with components and component part assemblies that are large, heavy and/or awkward to manipulate, which may hinder or otherwise limit the rate at which the station operators can perform assigned functions.

BRIEF SUMMARY OF THE INVENTION

According to an aspect of the present invention, a manufacturing cell comprises a main aisle and a plurality of stations arranged in two rows such that the main aisle passes between the two rows. Each of the plurality of stations is configured such that a corresponding station operator is capable of performing a predefined function associated with the manufacturing cell. Moreover, each of the plurality of stations has a station-aisle interface that provides an interaction area for the station to the main aisle. The manufacturing cell also comprises a plurality of storage units that are located along the main aisle with each storage unit being dimensioned to store at least one container. A forklift truck is automatically guided within the main aisle so that a stock handler controlling the truck is able to concentrate on the operations required to relocate containers within the cell to move containers from storage units to designated station-aisle interfaces for inbound workflows to the corresponding stations and to remove containers from the designated station-aisle interfaces for outbound workflows from the corresponding stations, without being required to also steer the truck within the main aisle.

According to another aspect of the present invention, a method of manufacturing parts using a manufacturing cell comprises storing at least some components to be used during manufacture on cell containers and storing the cell containers in storage units that are located along a main aisle which extends between a plurality of stations arranged in two rows. The method also comprises receiving an order to manufacture a part, using a forklift truck which is automatically guided while traversing the main aisle so that a stock handler operating the forklift truck is not required to provide steering control at least while the truck is in the main aisle and using the forklift truck for relocating cell containers from the storage units to designated station-aisle interfaces for inbound workflows to the corresponding stations and for removing containers from the designated station-aisle interfaces for outbound workflows from the corresponding stations, where each station-aisle interface provides an interaction area between the main aisle and a corresponding station.

BRIEF DESCRIPTION OF THE SEVERAL VIEWS OF THE DRAWINGS

The following description of illustrated and preferred embodiments of the present invention can be best understood when read in conjunction with the following drawings, where like structure is indicated with like reference numerals, and in which.

DETAILED DESCRIPTION OF THE INVENTION

Various aspects of the present invention relate to manufacturing cells that allow manufacturers to remain flexible and responsive to market demand, while providing manufacturing flexibility and efficiency.

Figure 1:
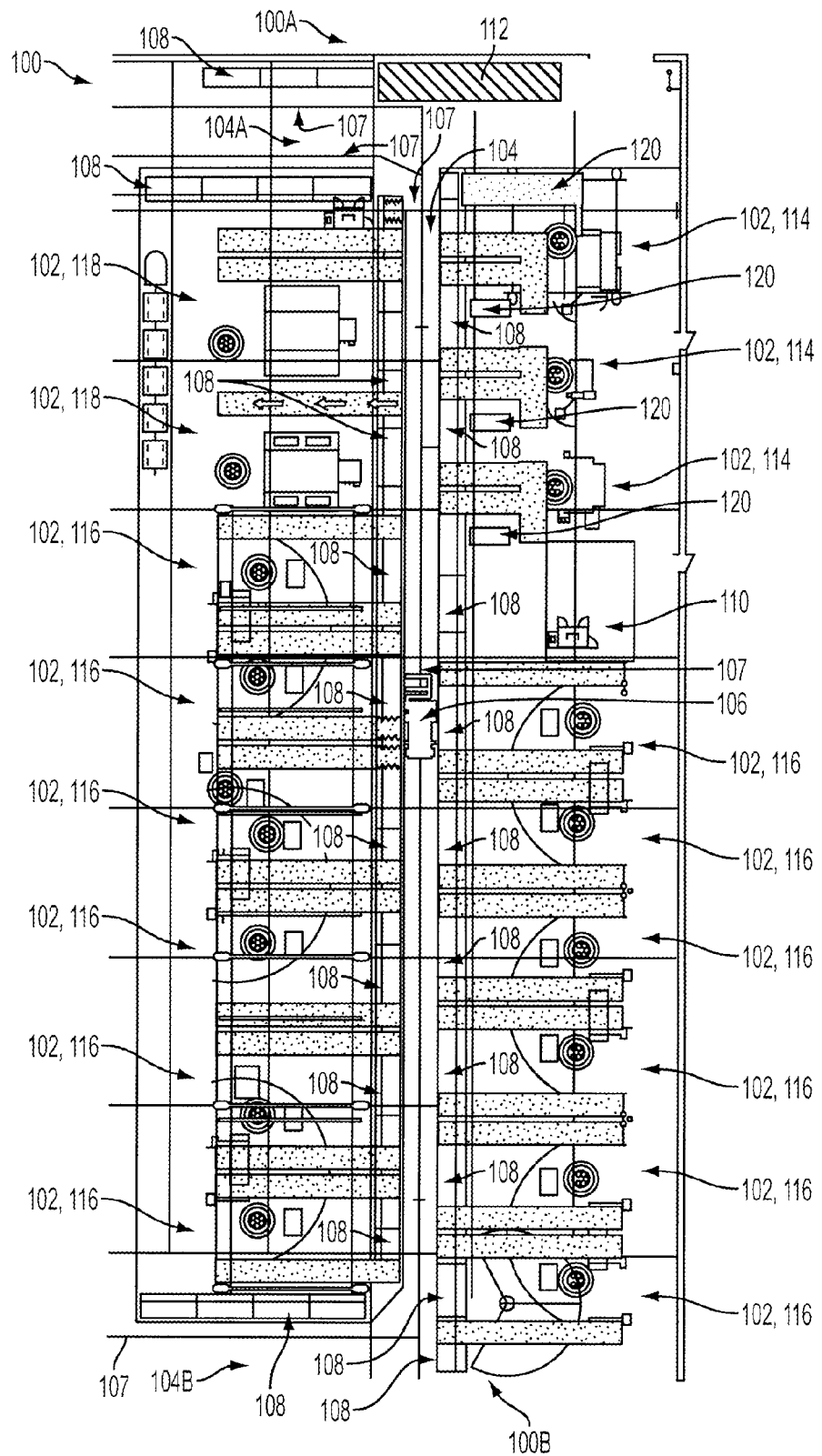
FIG. 1 is a schematic illustration of an exemplary manufacturing cell according to various aspects of the present invention.

Referring now to the drawings, and particularly to FIG. 1, a manufacturing cell 100 is illustrated according to various aspects of the present invention. The manufacturing cell 100 includes a plurality of stations 102, where each station 102 is assigned a predefined function associated with the manufacturing cell 100. As used herein, the "function" of a given station 102 will be largely defined by the machine(s), tools and/or operations that are performed in that station 102. For example, select stations 102 may each be equipped with a press brake and may thus perform the function of metal bending. As another example, select stations may each be equipped with welding equipment and may thus perform the function of welding. Still further, select stations may each be equipped with grinding tools and may thus perform the function of grinding. Various exemplary stations 102 and their functions will be described in the examples set out in greater detail below.

The number of stations 102 and the assignment of each station 102 to a particular function will be largely dependent upon factors such as the manufacturing environment and the types of parts, component part assemblies or products that are to be fabricated, manufactured, processed, assembled, etc., by the manufacturing cell 100. Further, factors such as the complexity of functions being performed by the various stations 102, the volume of work to be performed by the manufacturing cell 100, the space required by each station 102, the space available for the manufacturing cell 100, the available resources including machines and necessary work implements and other like factors may be considered when determining the number and functions of the various stations 102 of a given implementation of a manufacturing cell 100.

In the exemplary layout of the manufacturing cell 100, the various stations 102 are arranged generally in two rows of stations 102 that are separated by a main aisle passageway 104. A forklift truck 106 traverses the main aisle passageway 104 in a manner that allows the forklift truck 106 to service all of the stations 102 as will be described in greater detail herein so that only one forklift truck is required for operation of the entire manufacturing cell 100. The cell 100 further comprises storage units 108 which are accessible to the forklift truck 106. For example, storage units 108 may comprise vertically stacked racks located along both sides of the main aisle passageway 104 that may extend as high as the forklift truck 106 can access. Alternatively, the height of the storage units 108 may be limited by the height of a building or other structure that houses the cell 100. If desired or needed, additional storage units 108 may be positioned outside and adjacent to the main aisle passageway 104, e.g., in a row that intersects and is perpendicular to the main aisle passageway 104.

For example, as shown, the manufacturing cell 100 includes a first end portion 100A and a second end portion 100B, which are located at the respective ends of the rows of stations 102. The first end portion 100A may include a first additional aisle passageway 104A that extends generally perpendicularly to, and intersects a first end of the main aisle passageway 104, e.g., for supporting additional storage units 108. Similarly, the second end portion 100B may include a second additional aisle passageway 104B that extends generally perpendicularly to, and intersects a second end of the main aisle passageway 104, e.g., for supporting additional storage units 108.

According to an aspect of the present invention, the forklift truck 106 is equipped for guided steering, at least within the main aisle passageway 104. For example, a wire guidance system 107 (schematically represented by a line down the main aisle passageway 104 and within the first and second end portions 100A, 100B) may be utilized to facilitate operation of the forklift truck 106 within the main aisle passageway 104 and along the first and second end portions 100A, 100B, if provided in the cell 100. The use of guided steering technologies, such as wire guidance or others, allows the overall dimensions of the aisle 104 to be scaled down significantly, thus reducing the overall size requirements of the manufacturing cell 100. Guided steering also enables the stock handler to concentrate on the many other aspects of efficiently operating the forklift truck 106 including traction and fork control (raising, lowering and properly orienting the forks to move containers within the cell 100).

The forklift truck 106 may comprise a TSP6000 turret stockpicker truck commercially available from Crown Equipment Corporation of New Bremen Ohio, USA, the assignee of the present application. When the TSP6000 truck is steered by an operator, aisle size is commonly at least approximately 108" (2.74 meters) wide. However, guided steering technology, such as a wire guidance system, enables the TSP6000 to operate in an aisle, such as the main aisle passageway 104, having a significantly reduced width such as 71" (1.8 meters), which is just slightly greater than the width of the TSP6000 itself.

In this regard, a Crown TSP6000 truck is particularly suitable for use in the manufacturing cell 100 as the TSP6000 has a fork carriage that is side shifted and rotated 180 degrees, allowing the truck to pickup and deposit loads to the front or either side of the truck. Accordingly, the main aisle passageway 104 need not include extra width to accommodate turning or other maneuvers by the forklift truck 106. For example, the TSP6000 can traverse the main aisle passageway 104 forwards and backwards along a path controlled by the guided steering system and corresponding wire guidance system 107. Without changing the direction of its power unit, the TSP 6000 truck can raise, lower, turn and extend its forks to pickup and place loads to either side of the forklift truck 106. Thus, containers can be picked up, placed and moved from the storage units 108, including the storage units 108 along and on either side of the main aisle passageway 104 efficiently without requiring the stock handler to manually perform difficult maneuvers, such as may be required with other forklift trucks.

The manufacturing cell 100 may also include additional ancillary features, such as the provision for a supervisor or team station 110, which may include an office, desk, computers and other managerial related tools. Also, the manufacturing cell 100 may include a truck docking area 112, which provides a convenient location for battery charging, maintenance, storage, etc., of the forklift truck 106 when the forklift truck 106 is not in service.

Exemplary Cell Configurations

For purposes of discussion herein, the stations 102 will be described with reference to the manufacture of component parts for materials handling vehicles, and in particular, to the manufacture of doors and covers for various models of forklift trucks. The doors and covers utilized on forklift trucks may comprise, for example, components or component part assemblies of various sizes, shapes and configurations that are installed onto the corresponding trucks, e.g., using one or more pins, bolts or other suitable coupling members. However, this application is discussed herein by way of illustration and not by way of limitation as to the configuration and/or application of the manufacturing cell 100.

In the manufacture of doors and covers for forklift trucks, three typically required functions include bending, welding and grinding. Due to factors including product line differences and corresponding machinery and work implements required for those different product lines, time required to complete a job, and other relevant factors, there may be several stations 102 that perform the same function, such as bending, welding, grinding and the like. Each station that can perform the same function may be assigned to produce components for a single product line or may be assigned to produce components for two or more product lines.

In the illustrative embodiment, the manufacturing cell 100 comprises three press brake stations 114, twelve welding stations 116 and two grinding stations 118, which will each be described in greater detail herein. In practice, a cell 100 comprising any reasonable number of stations 102 may be implemented. Moreover, the specific implementation of a manufacturing cell 100 will define the number of stations 102 and the functions implemented by each station 102. As such, the various aspects of the present invention are not limited to, nor require per se, press brake, welding and grinding stations.

For example, the concepts herein may also be applied to the manufacture of other parts or part assemblies, such as vehicle chassis, motors, transmissions, electrical systems, hydraulics systems, forks/mast systems, and battery systems or other parts or parts assemblies, etc. Moreover, the concepts herein may be applied to manufacturing cells utilized for applications other than component parts and component part assemblies of materials handling vehicles and can be applied to manufacturing processes in general.

Each station 102 of the manufacturing cell 100 is equipped with the necessary work implements, e.g., the tools, tooling, jigs, dies and materials, required to perform the function(s) assigned to that station 102. For example, to facilitate utilization of the press brake stations 114, the storage units 108 within and about, e.g., along the first additional aisle passageway 104A, may include dedicated brake holding racks for holding tools, supplies, materials and other work related implements needed to efficiently operate the corresponding press brakes. Similarly, the press brake stations 114 may include further dedicated storage units, e.g., die racks 120 to store the assigned dies that are utilized by the press brake at that press brake station 114.

To further enhance efficiency of operation, each storage unit 108 may have one or more dedicated storage positions. Moreover, each dedicated storage position may be dimensioned to correspond with an associated container that is used to hold stock as will be described in greater detail herein. For example, as shown in the manufacturing cell 100 in FIG. 1, storage units 108 may be provided for each station 102, arranged generally adjacent to the aisle 104. This arrangement provides a convenient layout for the forklift truck 106 to move containers throughout the manufacturing cell 100 and to provide the appropriate containers to the associated stations 102.

Figure 2:
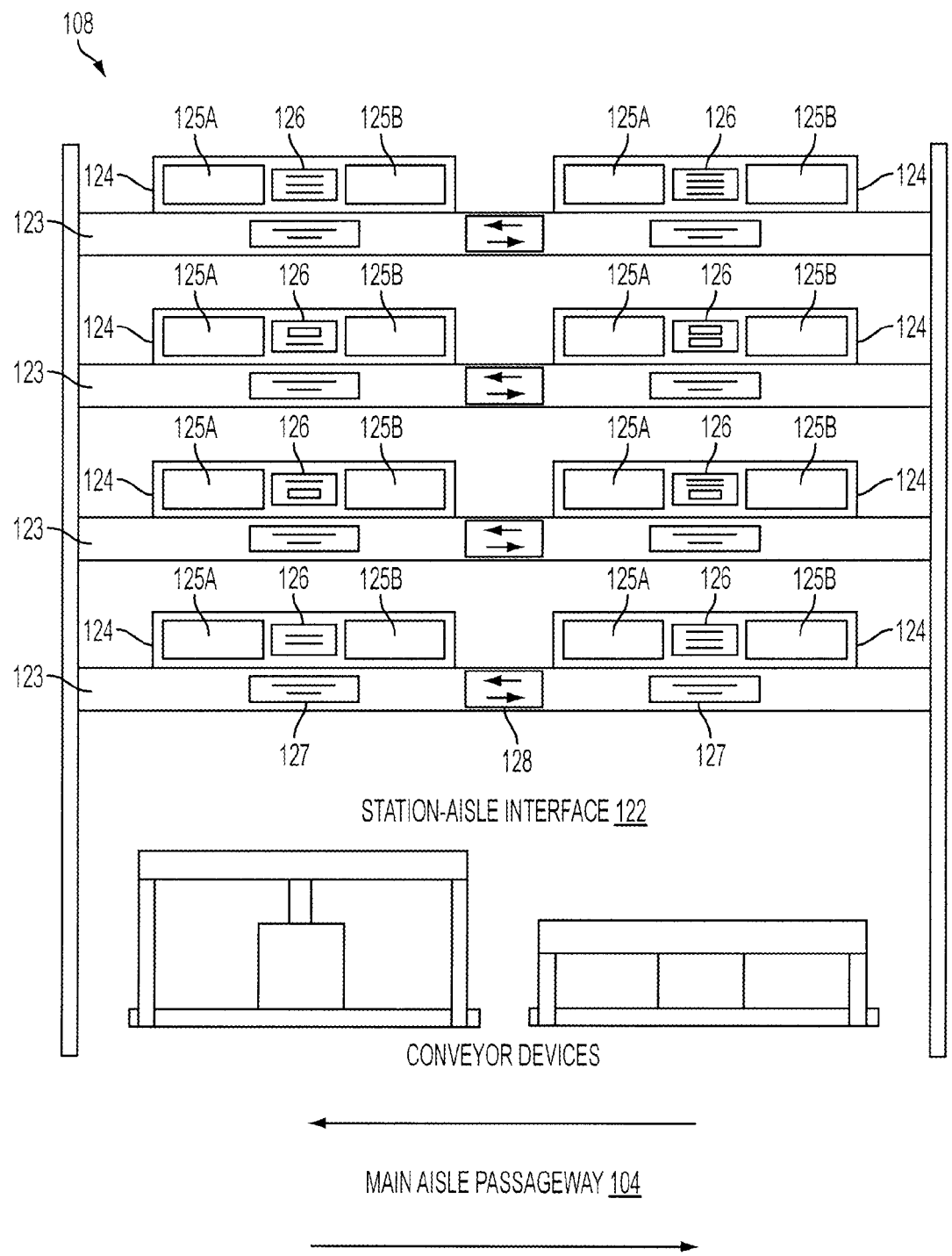
FIG. 2 is a schematic illustration of a storage unit positioned along a main aisle passageway of the cell of FIG. 1.

With reference to FIG. 2, an exemplary storage unit 108 is illustrated, such as may be positioned to one side of the main aisle passageway 104. As illustrated, the storage unit 108 is positioned above a station-aisle interface 122 which serves as a transition between the main aisle passageway 104 and a corresponding station 102. Two conveyors are positioned so that an end portion of each conveyor is proximate to the corresponding station-aisle interface 122. As such, the conveyors are accessible to the forklift truck 106 from the main aisle passageway 104. However, other suitable arrangements may alternatively be utilized. For example, in practice, a station-aisle interface 122 can include an open area that does not include conveyor(s) e.g., by providing a position underneath a storage unit 108 between a station 102 and the main aisle passageway 104 to store large containers 124 that would be impractical for use by the conveyors. As another example, different conveyor configurations may be provided in addition to or in lieu of that shown in FIG. 2. As another example, two adjacent stations 102 may share a common conveyor. Thus, the station-aisle interface for two or more stations may be a single shared interface, or it may interface with common components, such as a common conveyor. Various station-aisle interface configurations will be described in greater detail herein.

A plurality of rack shelves 123 are spaced vertically above the station-aisle interface 122. Each rack shelf 123 supports one or more containers 124. In practice, any number of rack shelves 123 may be used, depending for example, upon the vertical height requirements of containers 124 utilized in the storage unit 108, the available ceiling height, the maximum lift height of the forklift truck 106 and the like. Any reasonable number of containers 124 may be positioned on each rack shelf 123. The specific application may affect the allocation of rack shelves 123 and/or containers 124 to the rack shelves 123.

Each container 124 may hold and store one or more items, including for example, raw materials, parts, part assemblies, products, etc., that are used within and/or are fabricated, manufactured, processed, assembled, sub-assembled, etc., within the manufacturing cell 100. As shown, each container 124 includes a pair of fork receiving slots 125A, 125B, which are dimensioned to correspond with the forks of the forklift truck 106.

According to an aspect of the present invention, at least some of the containers 124 comprise pallet style containers that are physically smaller than a conventional pallet, for example half the size of a conventional pallet. The use of smaller containers, for example half the size of a conventional pallet, enables the overall physical size of the manufacturing cell 100 to be reduced. The actual realized space savings of a smaller pallet sized container compared to a conventional pallet sized container will depend upon the nature, e.g., size, quantity, etc., of the stock items being stored on each container. In practice, any practical number of container sizes may be implemented. Moreover, two or more containers 124 may store units of the same type of stock.

According to an aspect of the present invention, a system is provided for the organization and storage of containers 124 within the manufacturing cell 100. To enhance efficiency of operation, each container 124 is provided with a container tag 126. The container tag 126 may be temporarily fixed to the corresponding container 124. In a working embodiment of the present invention, tags formed on a magnetic material were used. However, other securing arrangements can be used. The container tag 126 may provide relevant instructions and information, such as an identification of the corresponding container 124, the expected container contents, an address/location of where within the manufacturing cell 100 the associated container 124 should be stored (such as by specifying a designated storage unit 108 and optionally, a specific position within a given storage unit 108), the starting quantity of stock items on the corresponding container 124, where to replenish the container contents from when the container has been emptied, what component parts are required to replenish each item on the corresponding container 124 and/or any other desired information.

Correspondingly, each storage unit 108 may have one or more dedicated storage positions, which may be identified using a suitable tag. The tags applied to the storage units 108 may also identify the expected content of a container stored at the corresponding storage position. The application of dedicated storage positions within storage units 108 allows, for example, each storage position to be dimensioned to correspond with an associated container 124.

For example, rack tags 127 may be provided at the face, e.g., on the vertical side surface of the rack shelves 123 or other suitable location of the storage unit 108. The rack tags 127 may include any suitable information, including for example, a corresponding identifier of the stock expected to be stored at that location. This identifier may be used, for example, to identify a location for storing a container 124.

One or more additional rack tags 128 may also be provided, e.g., to designate further information in addition to or in lieu of the rack tags 127. For example, the additional rack tags 128 may be utilized to identify a specific location within an associated storage unit 108. The information provided on the container tags 126 and rack tags 127, 128 can take various forms including any combination of information encoded into a sensed or scanned technology, e.g., scannable bar codes, Radio Frequency Identification Tags (RFID), etc., alphanumeric, symbols, icons and other visual human readable or machine readable indicia. Using the information on a given container tag 126 and a corresponding rack tag(s) 127, 128, the stock handler operating the forklift truck 106 has an immediate visual indication that can be used to verify that a given container 124 is in an appropriate storage location by matching stock part identification on both the storage tag 126 and the rack tag 127 and by matching the storage address of an associated container 124 on both the container tag 126 and the rack tag 128. Other arrangements and information may alternatively be utilized for the rack tags 127, 128. In this regard, the dedicated storage positions may be reassignable to accommodate changes in the flow of work through the manufacturing cell 100, such as by changing or replacing the rack tags 127, 128.

As an alternative arrangement, the locations within storage unit 108 may be assignable, e.g., by the stock handler operating the forklift truck 106. For example, each storage unit 108 may provide a plurality of storage positions that can be allocated by the stock handler or otherwise. In this regard, the stock handler operating the forklift truck 106 may chose any available location within the associated storage unit 108 to position or put away an associated container 124. The stock handler further associates, e.g., via an electronic record or manual recording, the container 124 to its newly assigned location.

The storage unit 108 may be used to store containers 124 that each support quantities of one or more internal stock items, i.e., parts, hardware, components, component assemblies and the like necessary for operation of the corresponding station 102. Where appropriate to an understanding of the various aspects of the present invention, the containers 124 reserved for use within the manufacturing cell 100, i.e., that support "internal" stock items will be further designated as cell containers 124A. The storage unit 108 may also be used to store containers 124 that supports product produced within the cell 100 that flows out of the cell 100, e.g., to a downstream process, to a customer, etc. Such product is placed on a container 124 that will be transported out of the manufacturing cell 100. Where appropriate to an understanding of the various aspects of the present invention, the containers 124 that are to be transported out of the manufacturing cell 100 will be further designated as transport containers 124B.

The transport containers 124B can be distinguished from cell containers 124A in a number of ways, such as by making the transport containers 124B different colors than cell containers 124A. The transport containers 124B can be further distinguished from one another along product lines, i.e., based on the products that are to be built using the parts on the transport containers. Thus, transport containers 124B for a given product may all be colored the same color. In this way, it is unlikely that parts for one product will be delivered to a production line that produces a different product.

In practice, the above idealized organization need not be strictly adhered to. For example, under certain circumstances, the vertical space or width of a given storage unit 108 may not allow all containers 124 that flow into and out of the associated station 102 to be positioned along the main aisle passageway 104 adjacent to, e.g., above the station-aisle interface 122.

As an example, assume the stock handler receives an order for the manufacture of one or more instances of part A, where each instance of part A requires components B, C and D to be welded together according to a prescribed arrangement. Further, assume that components B, C and D are stored on respective cell containers 124A in a storage unit 108 associated with a corresponding welding station 116 to which the order has been assigned (such as the storage unit 108 illustrated in FIG. 2). The stock handler travels down the main aisle passageway 104 to the appropriate storage unit 108 and utilizes the forklift truck 106 to retrieve the required cell containers 124A that support components B, C and D, respectively. The retrieved cell containers 124A are delivered to the station-aisle interface 122 of the corresponding welding station 116, e.g., by positioning the cell containers 124A containing components B, C and D onto one of the illustrated conveyors. The stock handler may also utilize the forklift truck 106 to provide a transport container 124B that is to be used for one or more completed instances of part A to the station-aisle interface 122 of the corresponding welding station 116.

When the appropriate cell containers 124A and optionally, a transport container 124B, are loaded into the station-aisle interface 122, the station operator performs the appropriate work to manufacture the number of instances of part A required by a given order and each instance of the manufactured part A is placed on the transport container 124B. The station operator then returns the cell containers 124A corresponding to components B, C and D as well as the transport container 124B to the station-aisle interface 122. The stock handler then typically puts the cell containers 124A back to a suitable storage location, e.g., in the storage unit 108 from where they came. Moreover, the stock handler typically relocates the transport container 124B to a different station, e.g., a grinding station 118, or the transport container 124B can be relocated to an outbound staging area for removal of the transport container 124B from the manufacturing cell 100.

Each of the cell containers 124A for components B, C and D may hold a quantity of components that is greater than what is required to manufacture part(s) A. As such, if there are components still remaining on a given cell container 124A when it is returned to the station-aisle interface 122, the stock handler simply restores that cell container 124A to its corresponding storage location using the forklift truck 106. If a cell container 124A is returned from a station 102 empty, the stock handler delivers the cell container 124A to an appropriate location and a replenishment operation is triggered as will be described in greater detail herein. As noted above, the location and/or other instructions for replenishment may be provided on a container tag 126 of a corresponding emptied cell container 124A thus facilitating an immediate and intuitive response from the stock handler.

In an exemplary implementation, if a cell container 124A requires components from outside the manufacturing cell 100 for replenishment, e.g., new blanks for a door or cover, an order may be manually or electronically generated. To that end, the stock handler may remove the container tag 126 from the corresponding cell container 124A, place the empty, untagged container in a container recycle area and scan or otherwise record that the cell container 124A previously identified by the tag 126 is empty. Upon scanning the container tag 126, an order may be automatically generated and communicated to a work area outside the manufacturing cell 100 to provide the needed components to the cell 100, e.g., by performing laser cutting, drilling or other pre-cell activity. As will be described in greater detail below, the stock handler may then relocate the container tag 126 to a suitable location, such as a tag board, and the recycled container 124 can then be transported outside of the cell 100 for use elsewhere in the factory, for example to return needed components to the cell 100, or for reuse within the cell 100.

According to an aspect of the present invention, there may be two or more cell containers 124A that contain the same component type. In this regard, it may be of interest to deplete a first one of the cell containers 124A before using remainder one of the cell containers 124A. As such, a flag, such as may be provided in the form of additional indicia, a tag, clip, color, label or other indicator may be used to designate to the stock handler, which of like cell containers 124A to use first.

The above-simplified example is presented by way of illustration and not by way of limitation as to an operation that may be performed using the manufacturing cell 100. As noted, not all containers 124 at a given storage location 108 may be required for a given work order. Moreover, each cell container 124A may store a quantity of internal stock items in excess of what is required to satisfy a given work order. In that instance, the cell containers 124A may be simply returned to their storage location, which may conveniently be located right at the station-aisle interface 122.

When determining the quantity of internal stock items to store within the manufacturing cell 100, any number of techniques may be utilized. For example, a manager, supervisor, analyst, etc., can evaluate daily demand, standard deviation, replenishment cycle, factor in tolerances, seasonal, periodic, outlier and other factors to determine the number of containers and the quantity of internal stock items per container when establishing a particular implementation of the manufacturing cell 100.

Figure 3:
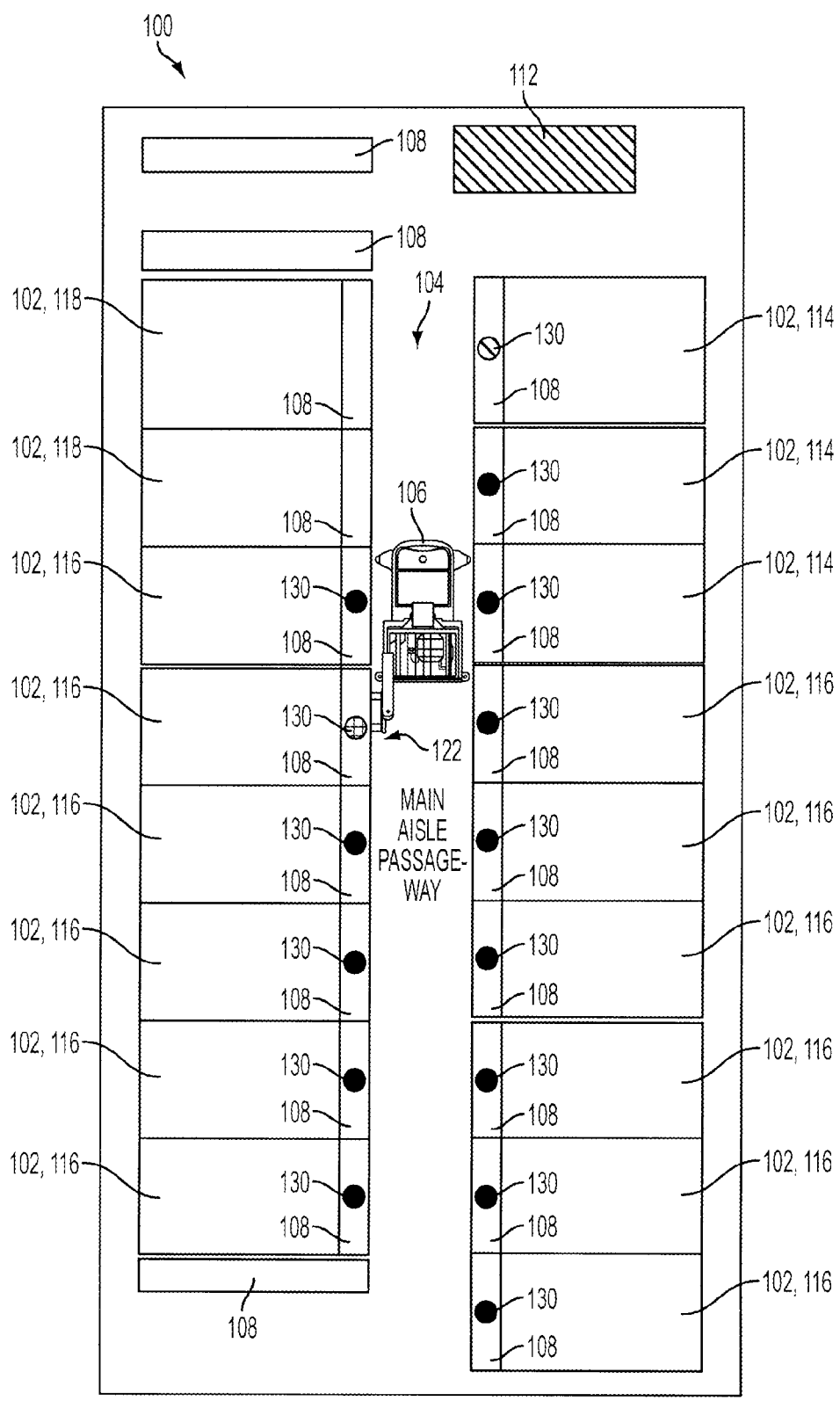
FIG. 3 is a schematic illustration of the manufacturing cell of FIG. 1 according to various aspects of the present invention.

Referring to FIG. 3, a simplified schematic illustration of the manufacturing cell 100 is shown. As is further illustrated, an indicator 130 is associated with at least some of the stations 102. The indicators 130 provide a status of the associated station 102, and may be implemented using any suitable techniques. Moreover, while illustrated for purposes of convenience and clarity as being positioned adjacent to the storage units 108 proximate to the main aisle passageway 104, other alternative locations for the indicators 130 may be implemented. Still further, the indicators 130 may be positioned in different locations depending, for example, upon the implementation of the corresponding station 102.

According to an aspect of the present invention, the indicators 130 provide a visual indication that identifies one of several possible states of the corresponding station 102. For example, the visual indicator 130 may identify the station as shut down, in need of the stock handler operating the truck 106, or full and/or running. The various states may be represented by pictures, numbers, icons or other suitable indicia. Further, the various states of each indicator 130 may be identified based upon color.

As an example, each indicator 130 may utilize a light that is red to indicate that the corresponding station 102 is in need of immediate assistance, a light that is yellow to indicate that the corresponding station 102 is in need of the stock handler, and a light that is green to indicate that the corresponding station 102 is operating. In an exemplary implementation, when the stock handler delivers at least one container 124 relating to work to be completed to a station 102, e.g., by placing one or more containers 124 at the station-aisle interface 122, the station operator at the station 102 sets the indicator 130 to a first color, e.g., green to indicate that the station 102 is running For example, as illustrated in FIG. 3, most of the indicators 130 are a solid color, indicating the first state.

When the work is complete and one or more containers 124 are ready to flow out of a given station 102, e.g., by positioning the containers 124 at the corresponding station-aisle interface 122, or where the station operator at a corresponding station 102 is waiting for containers 124 to be received at the station 102, the indicator is toggled to a second color, e.g., yellow. For example, as shown in FIG. 3, the indicator 130 in the upper right side of the figure has different shading compared to the indicators 130 directly there-below to distinguish the second state from the first state. Still further, if service from the stock handler is needed immediately, the station operator can toggle the corresponding indicator 130 to a third color, such as red. For example, as shown in the fourth station 102 down from the top left of FIG. 3 adjacent to the forks of the lift truck 106, the indicator 130 has yet a different shading indicating the third state.

Given the above system, the station operator at each station 102 has the capability of controlling the state of his/her station 102. Moreover, a supervisor, manager or other person can stand at one end of the main aisle passageway 104 and with a quick visual check, determine the state of the entire manufacturing cell 100 by noting the red, yellow and green lights. Accordingly, the state of the manufacturing cell 100 can be simply and quickly determined. Still further, the activity of the stock handler operating the guided forklift truck 106 can be directed by the state of the indicators 130. For example, the stock handler may have shop orders, either in hardcopy or softcopy, which tells the stock handler the jobs that need to be completed, the quantity and location of required internal stock items, etc. The stock handler directs the workflow related to delivery of the containers 124 into the stations 102, e.g., based upon the shop orders. Moreover, the stock handler directs the removal of the containers 124 from the stations 102 based upon the status of the stations 102 as designated by the indicators 130. As such, the tasks required by the stock handler may be organized and/or sequenced in response to yellow lights and/or red lights, etc.

Different and/or additional states may alternatively be designated. Further, other means of conveying the states of each indicator 130 may alternatively be utilized. For example, each indicator 130 may utilize visual and/or audible cues as to the current state. Moreover, the indicators 130 may be tied or linked into a computer system, such as for monitoring workflow, for controlling inventory, for verifying and/or identifying work orders, etc.

According to an aspect of the present invention, a Kanban type system may be utilized to conceptually organize the manufacturing cell 100. As an example, for manufacturing relatively large parts such as doors and covers for materials handling vehicles, each Kanban may comprise a pallet, ½ sized pallet, skid or other form of container that can be transported by the forklift truck 106. Each Kanban (also referred to herein generally as a container 124, a cell container 124A and/or a transport container 124B) may be utilized to store one or more like parts, component or component assemblies, materials, etc. required for processing within the manufacturing cell 100.

In general, a Kanban system strives to align inventory levels with actual consumption by utilizing a signal to trigger the various stations 102 of the manufacturing cell 100 to produce particular parts/part assemblies based upon a downstream manufacturing need for the part/part assembly. Methods of utilizing the manufacturing cell 100 are described in greater detail herein. Moreover, strict adherence to a formal Kanban system is not necessary to exploit the capabilities of the manufacturing cell 100.

Figure 4:
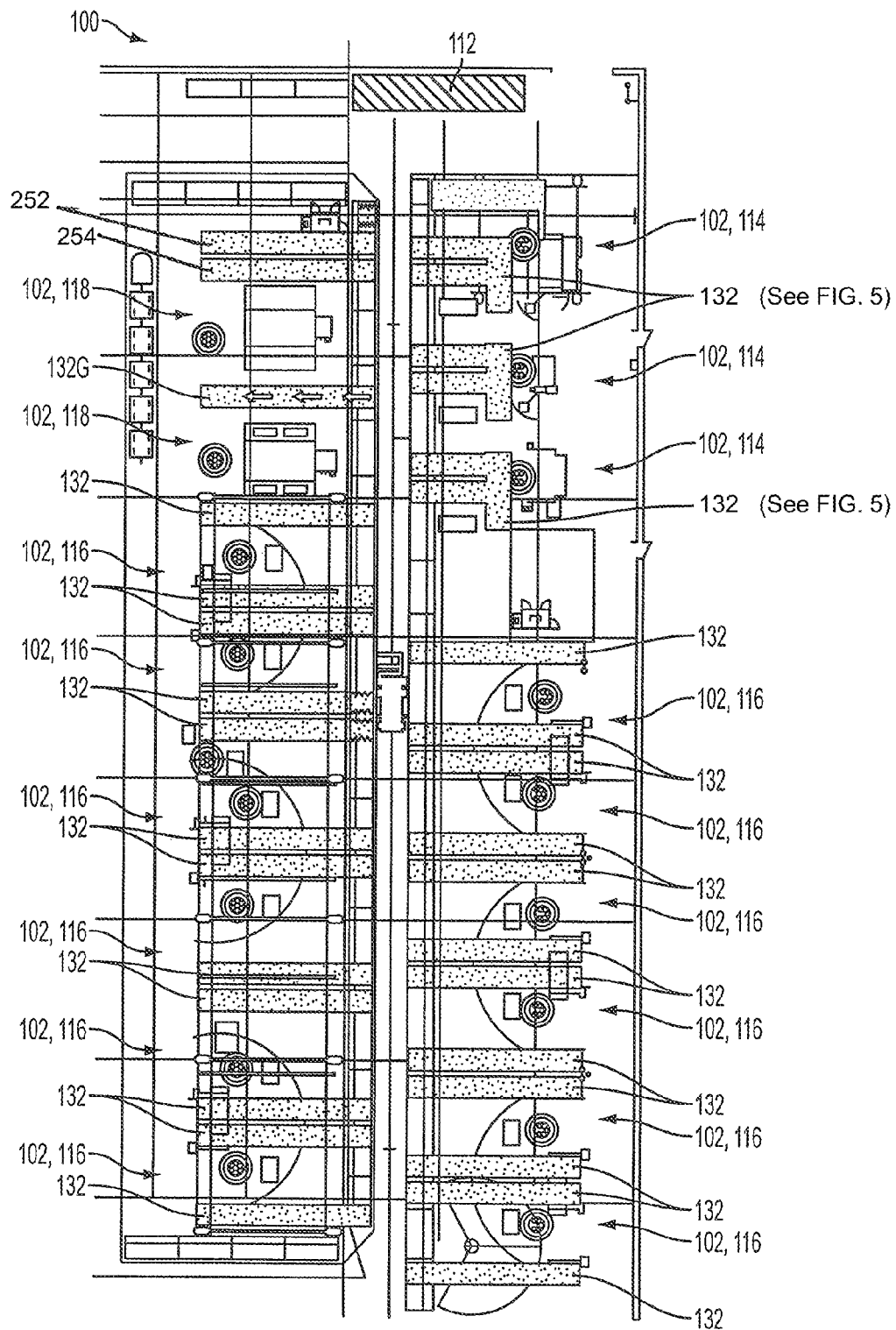
FIG. 4 is a schematic illustration of the manufacturing cell of FIG. 1 that illustrates exemplary conveyor arrangements that may be utilized by stations to move materials, components and component assemblies according to various aspects of the present invention.

With reference to FIG. 4, the illustrated manufacturing cell 100 includes a plurality of conveyor devices 132. As shown, there are two conveyor device 132 associated with each station 102 except for the two grinding stations 118 which share a single conveyor device 132G between them. For stations 102 having two conveyor devices, the operators may actively work from a first container 124 or group of containers 124 transported to the work area of the station on one of the conveyor devices 132 while a second container 124 or group of containers 124 is staged or queued on the other one of the conveyor devices in a manner that minimizes work interruptions. The multiple conveyor approach also provides flexibility in the implementing strategies such as first-in, first-out (FIFO) processing at the station 102.

As an illustrative example, a station 102, such as a press brake station 114, may receive one or more containers 124 at a corresponding station-aisle interface 122 by having the set of containers placed by the forklift truck 106 on a first one of two conveyor devices 132. The operator at the press brake station 114 performs the required bending operations and returns the completed parts back to an associated container 124. Upon completing the assigned task, a station operator relocates the container(s) onto the other one of the conveyor devices 132 for transport back to the station-aisle interface 122. The stock handler then utilizes the forklift truck 106 to pick up the container(s) 124 from the second one of the conveyor devices 132 at the station-aisle interface 122 to be delivered to another station 102 within the manufacturing cell 100 or to be delivered to another suitable location for transport outside the cell 100. As such, in this arrangement, a first one of the conveyor devices 132 is used for "inbound" containers 124 to the station and the other conveyor device 132 is used for "outbound" containers 124 from the station.

Alternatively, each of the conveyor devices 132 may be used as both inbound and outbound devices, that is, to both receive and return containers 124 between the station 102 and corresponding station-aisle interface 122. As an illustrative example, a station 102, such as a welding station 116, may receive one or more containers 124 at a corresponding station-aisle interface 122 by having the set of containers placed by the forklift truck 106 on a first one of two conveyor devices 132. A second set of containers may be staged by the stock handler operating the forklift truck 106 on the second conveyor device 132. Thus, the operator of the welding station 116 can perform the necessary work on the contents of the first set of containers 124 on the first conveyor device 132. Upon completion of the task, the first set of containers 124 can be returned to the station-aisle interface 122 to be picked up by the stock handler operating the forklift truck 106. The station operator can then move to the second conveyor device 132 to perform the necessary work on the contents of the second set of containers 124. While the station operator is performing the intended task, the stock handler can pick up and put away the first set of containers 124 and stage a third set of containers 124 on the first conveyor device 132 to queue up the next job for the station operator, and this pattern of operation may be repeated as necessary.

As shown in FIG. 4, the two grinding stations 118 share only a single conveyor device 132G. In the exemplary implementation of the manufacturing cell 100, the grinding stations 118 are an optional last station in the flow through the manufacturing cell 100. As such, the single conveyor device 132G is used as an inbound conveyor to both of the grinding stations 118. The operator in each grinding station 118 performs grinding operations on the next item that comes in on the shared conveyor 132G. When grinding operations are complete, the corresponding transport containers 124B are staged to be removed from the manufacturing cell 100 as will be described in greater detail below. In this configuration, the station-aisle interface for each of the grinding stations 118 may comprise the shared conveyor 132G.

If the manufacturing cell 100 is implemented in a Kanban or other "pull" type environment, the emptying of a container 124, regardless of whether that container is a cell container 124A or a transport container 124B, may signal that a replenishment operation is required. As such, an action such as scanning the container tag on an emptied container 124 may automatically trigger a replenishment workflow. By triggering workflow automatically, the manufacturing cell 100 can more quickly respond to observed demand, such as by propagating a demand or other suitable inventory signal or signals through the manufacturing chain.

The Kanban system as described herein, e.g., for the manufacture of doors, covers or other components of a finished product, e.g., a materials handling vehicle, can be integrated with "push" systems and/or alternative implementations of "pull" systems so that the Kanban is only operated with respect to the manufacturing cell 100 as described in greater detail herein. That is, the Kanban system implemented within the manufacturing cell 100 may be integrated with traditional push or forecast systems, traditional "pull" systems or with systems that utilize a hybrid approach where some aspects of manufacture are at least primarily push driven while other aspects are at least primarily pull driven.

With reference to FIGS. 1-4, as noted in greater detail above, the manufacturing cell 100 may include a plurality of stations 102. Certain stations may be assigned to the same general function but perform different operations, e.g., manufacture parts associated with a different product line or product lines. For example, as shown, there are three press brake stations 114. Each press brake station 114 may be equipped with its own unique set of dies, e.g., as stored on the corresponding die racks 120, which may correspond to a particular size, style, configuration, etc. of door. As such, in order to change manufacturing, for example, from a first door type to a second door type, the system need only route the appropriate container 124 to the corresponding one of the press brake stations 114. The operator at the assigned press brake station 114 already has the appropriate tools, dies etc., to make the desired part, so there is minimal to no waste in labor related to the preparation before commencing actual work.

As another example, two or more of the stations 102 may be assigned to the same general operation for work associated with the same product lines. For example, there may be several welding stations 116 that are each equipped with their own instance of the required work implements, e.g., jigs associated with each supported product line. As such, a station operator at a given one of the welding stations can quickly set up for a new one of the supported product lines because the required work implements are stored at the station 102. The grinding stations 118 may also each be similarly equipped so that work requiring a grinding operation can be performed at either grinding station 118.

Accordingly, aspects of the present invention reduce variation and process adjusting because the individual stations 102 position work implements, e.g., fixtures, jigs, supplies and tools, at the point of use. Accordingly, this may allow an operation to meet maximum capacity demands and/or enable condensation of station operator operating shifts, e.g., to reduce/consolidate a workforce from three or two shifts down to two or one shift so that all station operators in the manufacturing cell 100 can work more desirable hours. Being able to offer appealing working hours may mitigate resource problems, such as where it may be difficult to obtain skilled employees to work late, or otherwise undesirable hours.

Press Brake Stations

The press brake stations 114 may be utilized to bend or otherwise manipulate the heavy gauge working materials, e.g., to form parts used to make the doors and covers. In press-brake bending, a workpiece is typically placed between upper and lower dies. The desired part is formed through force and pressure exerted on a workpiece by moving a ram towards a corresponding bed. The upper and lower dies define the bends, folds, etc., which the ram imprints on the workpiece. As such, the correct die must be utilized for each product manufactured by the manufacturing cell 100.

The dies utilized in the formation of parts used as or to construct doors, covers, etc., for each product line may be divided among, and locally stored at corresponding press brake stations 114 so that product changeover may be implemented relatively expediently. For example, changeover may simply require selecting an appropriate one of the braking stations 114. Alternatively, where a selected brake station 114 must perform a changeover, e.g., to accommodate a run of a new product line, all of the necessary work implements are stored right at the brake station 114.

Other tooling, such as may be required for punching, countersinking, dimpling, embossing operations, etc., may also be stored at the appropriate press brake stations 114. Still further, the press brake stations 114 may also include other ancillary equipment, such as gauging equipment, soapsticks and other tools for manipulating stock to form doors and covers for materials handling vehicles.

Moreover, the press brake stations 114 need not be limited to operations related to doors and covers. Rather, with proper dies and tooling configuration, the press brake stations 114 may be utilized for the manufacture of other components of materials handling vehicles (or other products in general). Further, the illustrated press brake stations 114 are set up to bend or otherwise manipulate heavy-gauge materials. However, depending upon the application of the manufacturing cell 100 and/or parts not related to the application but required by the manufacturing facility including the cell 100, the press brake stations 114 may be equipped to perform light gauge processing, e.g., using manual or automatic folding equipment like bending machines and/or swivel benders, pan, leaf or box brakes, folders, etc.

In keeping with the exemplary Kanban system discussed above, the brake stations 114 may also include parts or blanks used in the press brakes, such as by storing suitable raw materials in the storage units 108 associated with the corresponding brake stations 114. As an example, when raw material is taken from a container 124 stored in a storage unit 108 associated with one of the brake stations 114, the transitioning of the container 124 may trigger a replenishment operation or gating operation, where replenishment parts are cut from stock materials, such as by using shears, lasers, saws, etc. The cutting may be performed by a process outside of the manufacturing cell 100, or by a process internal to the manufacturing cell 100.

Figure 5:
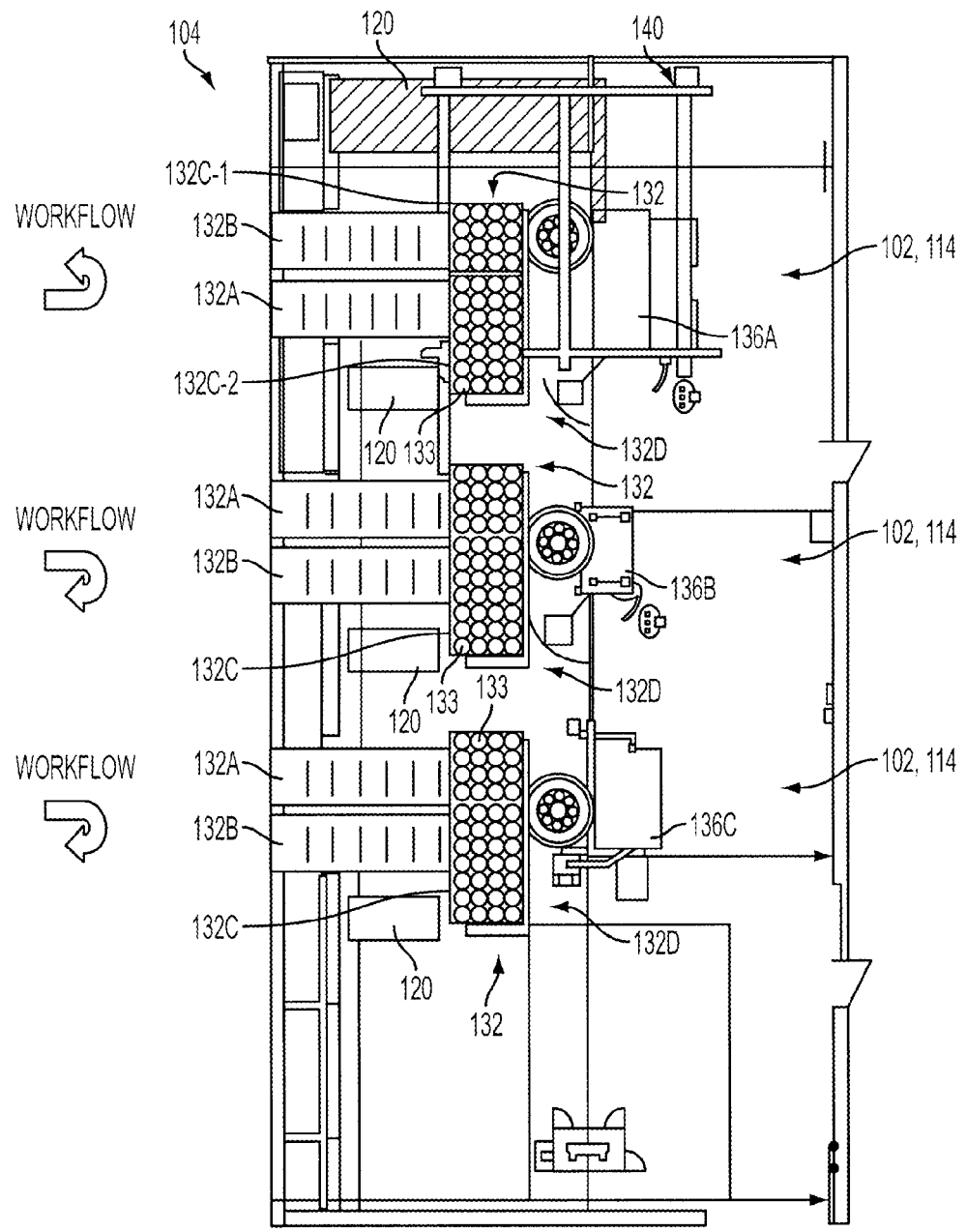
FIG. 5 is a schematic illustration of a few stations of the manufacturing cell of FIG. 1 that illustrates exemplary conveyor arrangements that may be utilized by stations to move materials, components and component assemblies according to various aspects of the present invention.

Referring to FIG. 5, each press brake station 114 may include, for example, a different type of press brake 136A, 136B, 136C to provide flexibility to the manufacturing capabilities of the manufacturing cell 100. According to an aspect of the present invention, each press brake station 114 may also include an inbound conveyor 132A, an outbound conveyor 132B and a cross conveyor 132C. The inbound conveyor 132A and the outbound conveyor 132B are generally long, conveyance devices to move containers 124, e.g., from the corresponding station-aisle interface 122 to the work area of the corresponding press brake station 114, and may be implemented, for example using a roller-type conveyor system. The cross conveyor 132C may comprise, for example, a roller ball transfer platform that bridges the inbound conveyor 132A to the outbound conveyor 132B so that containers 124 can be moved easily from the inbound conveyor 132A to the outbound conveyor 132B. Moreover, there may be a location near the cross conveyor 132C of the press brake stations 114, e.g., at point 132D, where an operator can discard an empty container 124 which is not returned to the station-aisle interface 122.

As shown, the workflow, and thus the location of the inbound conveyor 132A compared to the location of the outbound conveyor 132B is selected in accordance with the working direction (left to right or right to left) of the corresponding press brake. Accordingly, for purposes of illustration, the workflow, and correspondingly the order of the inbound conveyor 132A relative to the outbound conveyor 132B is opposite for the press brake station 114 associated with the first press brake 136A compared to the second and third press brake stations 114 corresponding to press brakes 136B and 136C respectively.

Also, as illustrated in FIG. 5, the cross conveyor 132C that is associated with the first press brake 136A is implemented as two sections, including a first section 132C-1 and 132C-2. In this exemplary implementation, the first press brake 136A may be a 230 ton press brake capable of manipulating relatively large parts. As such, the first section 132C-1 of the cross conveyor 132C may be height adjustable to accommodate the movement of parts from their associated container 124 to the press brake 136A and back to the container 124. An exemplary adjustable height table suitable for use as the first section 132C-1 of the cross conveyor 132C is described and illustrated with respect to FIG. 13B herein.

The roller balls 133 of the cross conveyors 132C may comprise, for example, large steel ball bearings or other structures that reduce the force required to slide components across the corresponding cross conveyor 132C. In practice, the number of roller balls 133, the spacing between the roller balls 133, the size of each roller ball 133, etc., will likely depend upon the specific implementation. Also, other configurations of conveyor devices 132A, 132B, 132C may be implemented.

The disclosed combination of roller-type conveyor for the inbound conveyor 132A and outbound conveyor 132B in combination with the roller ball type conveyor for the cross conveyor 132C may be selected and maintained, for example, to limit the amount of force required to push or pull items over the conveyors to facilitate the manufacture of heavier parts with reduced exertion on the part of the press brake station operators and assistants if needed.

In an exemplary implementation of making doors and covers for materials handling vehicles, flat blanks may be pulled from stock by the stock handler operating the truck 106. The stock handler places one or more flat blanks supported on a container 124, on the inbound conveyor 132A of an appropriately assigned press brake station 114. The stock handler may also leave an empty container 124 that is to be filled and returned to a welding area (cell container 124A) or to a location outside the cell (transport container 124B). Parts are formed at the brake press stations 114, e.g., in a first-in, first-out (FIFO) manner After forming, the parts are sent to the corresponding station-aisle interface 122 on the outbound conveyor 132B for pickup by the stock handler operating the forklift truck 106. The container 124 that held the blanks may be returned on the outbound container 132B or can be discarded, for example at the designated discard area 132D.

The stock handler then delivers the parts in their corresponding container 124 from the press brake station 114 to a dedicated location within a correspondingly assigned weld area, e.g., to an inbound conveyor of a welding station 116 or to a suitable storage unit 108 located adjacent to a correspondingly assigned welding station 116. Alternatively, the container 124 may be relocated to a storage area for pickup and delivery to a location outside the manufacturing cell 100, such as where no further processing is required by stations 102 within the manufacturing cell 100.

When the stock handler picks up the container 124 having formed parts thereon, a replenishment order for new blanks may automatically be generated, such as when an appropriate tag is scanned, etc. Alternatively, the replenishment order may be triggered when the parts are used up, e.g., removed from their associated container 124 in a downstream process, which may occur outside the manufacturing cell 100. For example, the formed parts may need to pass to a welding station 116 and to a grinding station 118 before being removed from the manufacturing cell 100. The parts may then go downstream, such as to a paint process which is outside the cell 100. However, the parts will remain on the same container for all of the above processing and thus not trigger a replenishment operation. A replenishment order is created with the parts are removed from their container, such as in an assembly process where the covers are assembled to corresponding materials handling vehicles.

Where the containers 124 and/or parts to be handled are too large to be manually maneuvered by a station operator, a mechanical manipulator 140 or other assistance device or devices may be utilized. The manipulator 140 may be an overhead crane or other apparatus utilizing hooks or handling devices operated using suction, pressure, etc. to assist in lifting and handling large, bulky, awkward parts. For example, the manipulator 140 may assist the operator in moving heavy parts, e.g., in excess of 45 pounds (20.41 kilograms) or some other reasonable weight. An exemplary manipulator 140 is described with reference to FIG. 15.

Figure 6:
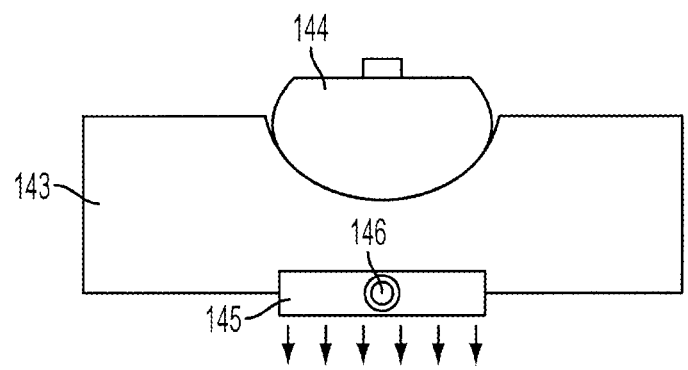
FIG. 6 is a schematic illustration of an assist for moving heavy work implements, such as brake press dies, according to an aspect of the present invention.

With reference to FIG. 6, when operating a large press brake, it is not uncommon for a required die to weigh several hundred pounds to over a thousand pounds. The weight of the die may be a limiting factor in the time required for a station changeover. However, according to an aspect of the present invention, a work implement assist is provided to help an operator move such heavy objects. In the illustrative example, the work implement assist is utilized when changing out press brake dies and thus includes a cradle 143 for receiving a corresponding die 144, as well as a lift assist block 145, which is positioned under the cradle 143. The lift assist block 145 includes a block connector 146, such as an ordinary quick connect pneumatic fitting for receiving air pressure. Air flows through the block connector 146, through ductwork (not shown) internal to the lift assist block 145 and flows out a plurality of holes (not shown) along the bottom surface of the lift assist block 145 thus providing enough lift to "float" the cradle 143 and hence the die 145. Thus, when air pressure is applied to the block connector 146, the lift assist block 145 lifts up from the table or other surface enough that an operator can easily and controllably navigate the die to an appropriate loading position within a corresponding press brake. For example, 20 pounds per square inch (p.s.i.) to 40 p.s.i. may be sufficient to lift dies or other heavy work implements by an amount sufficient to allow a single operator to move the die.

Figure 7:
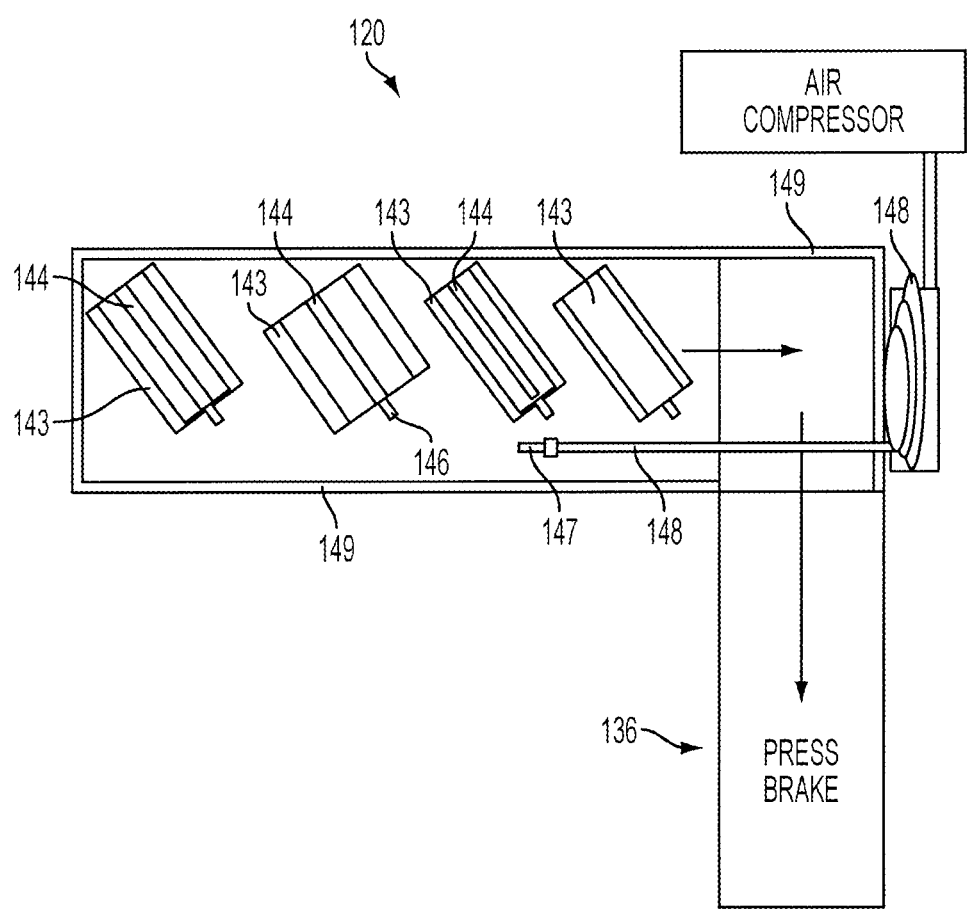
FIG. 7 is a schematic illustration of a system that provides an operator-assisted system for moving dies into a working position of a press brake according to an aspect of the present invention.

With reference to FIG. 7, several exemplary dies 144, each supported by an associated cradle 143 are shown. During a work changeover, a press brake operator may be required to change out the currently loaded die 144 from the press brake. As noted above, the dies commonly weigh several hundred pounds to over a thousand pounds. Accordingly, the operator may first couple a source connect 147, such as a pneumatic quick connect fitting that mates with the block connector 146, to the empty cradle 143 that is associated with the currently loaded die 144. The source connect 147 is coupled to a source of pressurized air, such as an air compressor by a suitable hose 148. As shown, the hose 148 is provided on a take-up reel that automatically winds up the hose 148 when not in use for convenient storage and to keep the hose 148 neatly stowed. When air pressure is applied through the hose 148, the lift assist block 145 of the empty cradle 143 provides lift that allows the operator to easily, e.g., with one hand and minimal effort, navigate the empty cradle 143 along the table 149 to the press brake. When the die is removed, the cradle 143 with the loaded die 144 thereon is floated back to its appropriate storage location.

Once the previous die 144 has been removed from the press brake and has been returned to an appropriate storage location, the next die 144 is floated into position for loading into the press brake in a manner as described above. As shown, for purposes of convenience, the dies 144 are stored on a table 149 that generally forms an "L" shape with the press brake. As such, the dies 144 can be floated down the table and directly into a channel of the press brake where the dies 144 are to be loaded and removed from the press brake.

In order to provide efficient operation, the table 149 should be as flat and level as possible. Moreover, the height of the table should be adjusted to correspond with the height of the channel of the press brake where the dies are loaded and removed.

To enable a larger variety of part numbers to be produced in the press brakes, a quick die change procedure may be utilized, where an additional person, designated as a production tender, will assist the primary press station operator during die changeover operations. The production tender is to have all tooling and gauging required to run the next job assembled and ready to install before the changeover operation is to take place. During changeover, standard operations may be assigned to the primary operator and to the production tender.

As an example, to make a cover or door for a materials handling vehicle, blanks may be provided to the manufacturing cell 100. In this regard, the mechanism that directs the manufacturing to begin may be driven by a pull or other demand based system based upon a forecast system, by a material requirements planning (MRP) system or other inventory/manufacturing requirements process. The operator at an assigned press brake station 114 receives the blanks, which are delivered, for example, by the stock handler on the forklift truck 106 on an associated container 124. Based upon the parts to be fashioned, if necessary, the operator sets up the appropriate dies, which may be stored locally at the corresponding press brake station 114, e.g., in a corresponding die rack 120, 149.

When a cell container 124A containing blanks is emptied at one of the brake presses 136A, 136B, 136C, e.g., when a container 124A is discarded at the designated area 132D, the corresponding part number may be scanned or otherwise identified, such as by scanning a tag or label on the discarded cell container 124A, and an order may be sent to an associated gating operation such as a laser cutter, etc. to replenish the blanks. The above order to an operation outside of the manufacturing cell 100 may not be required, however. For example, a replenishment order may not be required where replacement blanks are already stored, e.g., within a storage area 108 within the manufacturing cell 100. Where utilized, information may also be updated and/or entered into an associated MRP or other electronic control and/or tracking system.

Alternatively, the order sent to the gating operation for replenishment of the blanks may be triggered by a process downstream of the manufacturing cell 100. In this regard, a downstream process that empties an associated transport container 124B that contains the doors or panels may trigger the order, which may be communicated directly to the gating operation. As such, the manufacturing cell 100 is not required to participate in the driving mechanism that triggers replenishment of blanks to be delivered to the manufacturing cell 100.

Additionally, routing text provided in the order may identify, for example, what type of container 124 must be used to return the part to the manufacturing cell 100. The containers 124 are thus used as inputs to the MRP system since the equipment used in the gating system may not be dedicated to the manufacturing cell 100 but may rather be used for other manufacturing operations within the manufacturing plant.

Alternatively, the gating system could be dedicated to the manufacturing cell 100 and may thus be driven directly by the Kanbans generated by the manufacturing cell 100. Still further alternative techniques may be utilized to track the flow of components through the manufacturing cell 100.

As another example, blanks may be stored in a suitable storage location 108 within the manufacturing cell 100. Under this alternative arrangement, as transport containers 124B are emptied in the plant that actually manufactures various materials handling vehicles from the doors, covers and other parts produced by the manufacturing cell 100, bar codes or other suitable designation indicia, tags or other information bearing media may be read to create orders, such as for replenishment of the used doors, covers and/or other parts. The orders may be transferred to and printed out on a suitable processing device, e.g., a desktop printer within the supervisor or team station 110 within the manufacturing cell 100. As yet another example, orders may be communicated wirelessly, directly to the forklift truck 106. The stock handler may utilize a printer on board the forklift truck 106, or the stock handler may process the orders electronically.

Welding Stations

The manufacturing cell 100 as illustrated includes a plurality of welding areas. For example, as discussed above, the manufacturing cell 100 includes twelve welding stations 116. In general, after parts for the doors and covers have been processed at a press brake station 114, they are routed to an assigned welding station 116 where necessary welding operations are performed to combine the parts to make the required doors and covers.

As another example, the emptying of the containers 124 at the weld areas, e.g., at the welding stations 116, may be utilized to generate orders for the press brake stations 114 to produce more parts, thus driving the "pull" of the Kanban philosophy.

According to an aspect of the present invention, the conveyor devices 132 in each welding station 116 may be implemented as "seesaw" conveyors 150, with the ends of the seesaw conveyors 150 moving in opposite directions about a pivot point for the conveyors 150, i.e., as one end goes downward the other end goes upward and vise versa.

Figure 8:
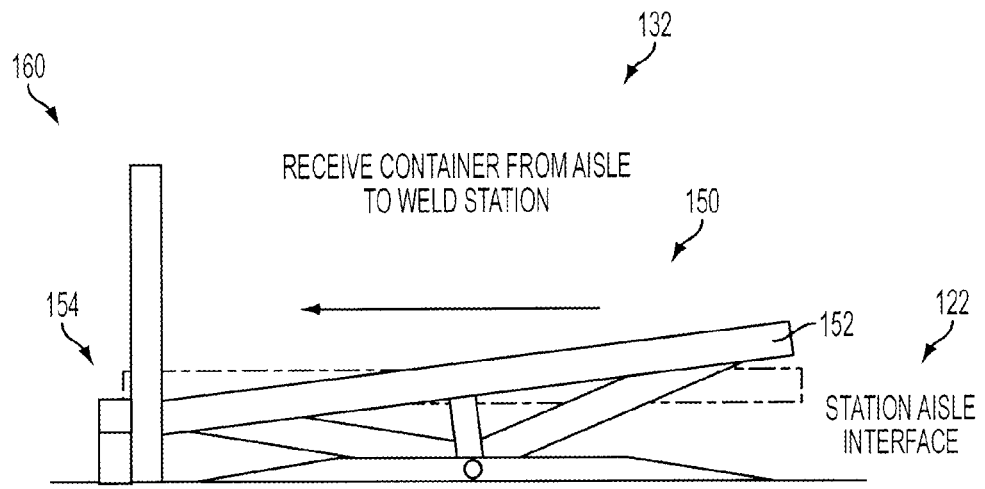
FIG. 8 is a schematic illustration of a conveyor arrangement in a first position operatively arranged to transport containers from a main aisle passageway of a manufacturing cell to a work area of a corresponding station according to various aspects of the present invention.

Referring to FIG. 8, each seesaw conveyor 150 can be tilted so that it slopes downward toward the corresponding welding station 116 relative to a corresponding station-aisle interface 122 for an inbound orientation so that containers 124 travel into the corresponding welding station 116. For example, the seesaw conveyor 150 may comprise a tiltable conveyor platform 152, e.g., a roller platform that has one end coupled to the end of a lift mechanism 154. As the lift mechanism 154 is operated to move the corresponding end of the tiltable conveyor platform 152 downward, the other end of the conveyor platform 152 proximate to the station-aisle interface 122 moves upward so that containers 124 are gravity fed to a work area of the corresponding welding station 116.

Figure 9:
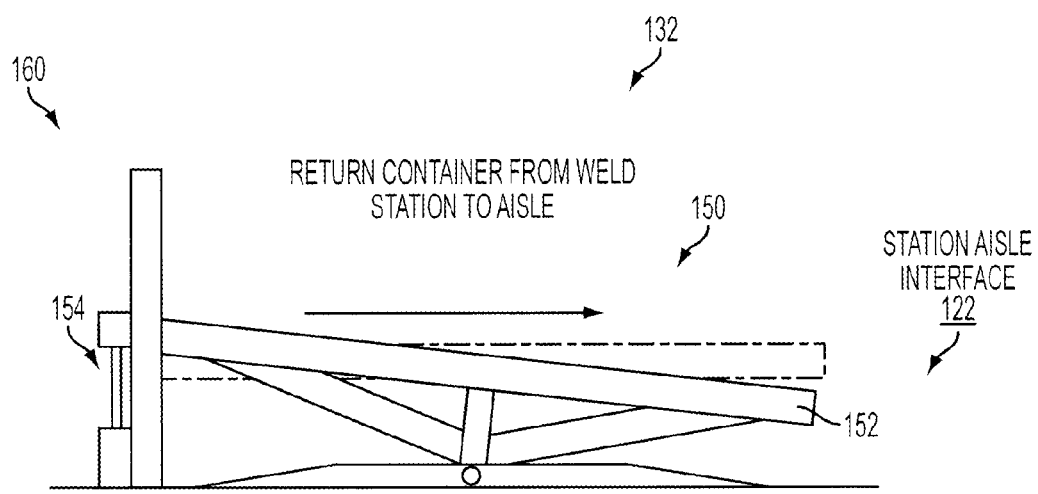
FIG. 9 is a schematic illustration of the conveyor arrangement of FIG. 8 in a second position operatively arranged to transport containers from the work area to the corresponding main aisle passageway according to various aspects of the present invention.

Referring to FIG. 9, when an order is completed, the seesaw conveyor 150 may be tilted in the opposite direction. For example, the lift mechanism 154 may be extended upward so that the end of the conveyor platform 152 proximate to the corresponding station-aisle interface 122 is moved downward and the end of the conveyor platform 152 coupled to the lift mechanism 154 is moved upward. Accordingly, the seesaw conveyor is moved to an outbound orientation to enable containers 124 to be gravity fed to the station-aisle interface 122 to be picked up by the stock handler operating the forklift truck 106. The stock handler may then utilize the forklift truck 106 to take the container(s) 124 from the outbound oriented conveyor 150 to a suitable location. Thus, cell container(s) 124A are taken to the next station 102 in the manufacturing cell 100 for further processing, such as to a grind booth in one of the grind stations 118 and transport container(s) 124B are taken to a completed outbound conveyor of the manufacturing cell 100.

Each seesaw conveyor 150 includes a pivot point located at a position along the length of the tiltable conveyor platform 152. In practice, the pivot point may be positioned anywhere between the ends of the conveyor platform 152. For example, offsetting the tilt position from the longitudinal center of the conveyor platform 152 may provide improved operation depending upon factors such as the anticipated weight on the conveyor platform 152 and the lifting capabilities of the hydraulic lift mechanism 154. With regard to the work required of the hydraulic lift mechanism 154, the closer the pivot point is located to the station-aisle interface, the less the work required. Also, by utilizing a seesaw configuration, the vertical distance that the conveyor platform 152 must be raised and lowered by the lift mechanism 154 in order to gravity feed containers 124 can be reduced relative to fixing one end of the conveyor platform 152.

Figure 10:
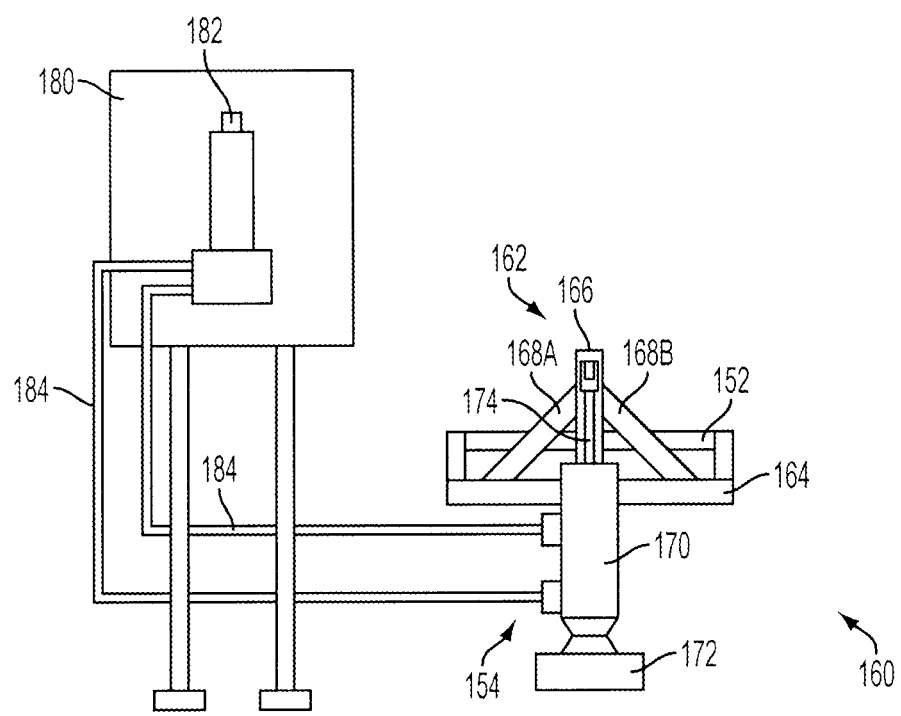
FIG. 10 is a schematic illustration of an exemplary hydraulic control for operating the tilt capabilities of the conveyor of FIGS. 8 and 9 according to various aspects of the present invention.

Referring to FIG. 10, an exemplary system for controlling a seesaw conveyor 150 is illustrated. The conveyor platform 152 has a first end portion 160 that includes a lift support 162 secured thereto. In the exemplary implementation, the first end portion 160 comprises the end of the conveyor 150 that is oriented in the work area of the corresponding welding station 116 opposite of the end of the conveyor 150 that is positioned at the corresponding station-aisle interface 122. As shown, the lift support 162 includes a first support 164 that extends horizontally across the width of the conveyor platform 152 to form a base, a second support 166 that extends vertically from the first support 164, and two angularly extending supports 168A 168B that each form a right triangle with the first support 164 and second support 166.

To provide the tilt capability to the seesaw conveyor 150, the lift support 162 is coupled to the lift mechanism 154, which may be implemented, for example, by a hydraulic cylinder 170. The hydraulic cylinder 170 includes a lower portion that is secured to a base 172 in a manner that allows the hydraulic cylinder 170 to pivot slightly as the end of the conveyor platform 152 is raised and lowered, such as by using a pin, clevis or other suitable connection. The hydraulic cylinder 170 is controlled to extend and retract a piston 174 having an end portion that is coupled to the lift support 162, e.g., using a clevis or other suitable connection. For example, as schematically illustrated, a support positioned proximate to the apex of the lift support 162 may be received between the arms of a clevis, which is coupled to the end of the lift arm 174. A pin or other suitable arrangement may be used to secure the support to the clevis.

Adjacent to the seesaw conveyor 150 is a support stand 180 that supports a hydraulic pump 182. Hoses 184 connect the hydraulic pump 182 to the hydraulic cylinder 170 for controlling the extension and retraction of the piston 174. In practice, the hydraulic pump 182 may be relocated to any suitable position depending, for example, upon the layout of the particular implementation of the manufacturing cell 100 and/or station 102. Moreover, the controls for operating the hydraulic cylinder 170 may be located on the hydraulic pump 182, on the support stand 180, or any other suitable location, and can include operation by a computer, software or other suitable control arrangements.

Other conveyor arrangements may also be implemented, for example, by using alternative technologies to assist the operator in moving containers 124 from the corresponding station-aisle interface 122 to the welding area of the corresponding welding station 116.

The operator of a welding station 116 may work from one seesaw conveyor 150 while the next order for that welding station 116 can be queued up on the second conveyor 150 as described more fully herein. The use of the two seesaw conveyors 150 assures that the operator will not have to wait for the next order to be delivered. Thus, the trained station operator can continue working at a comfortable and steady pace. The two conveyor approach may also maximize the time that the skilled station operator spends welding, thus reducing wasted time and inefficiencies.

Figure 11:
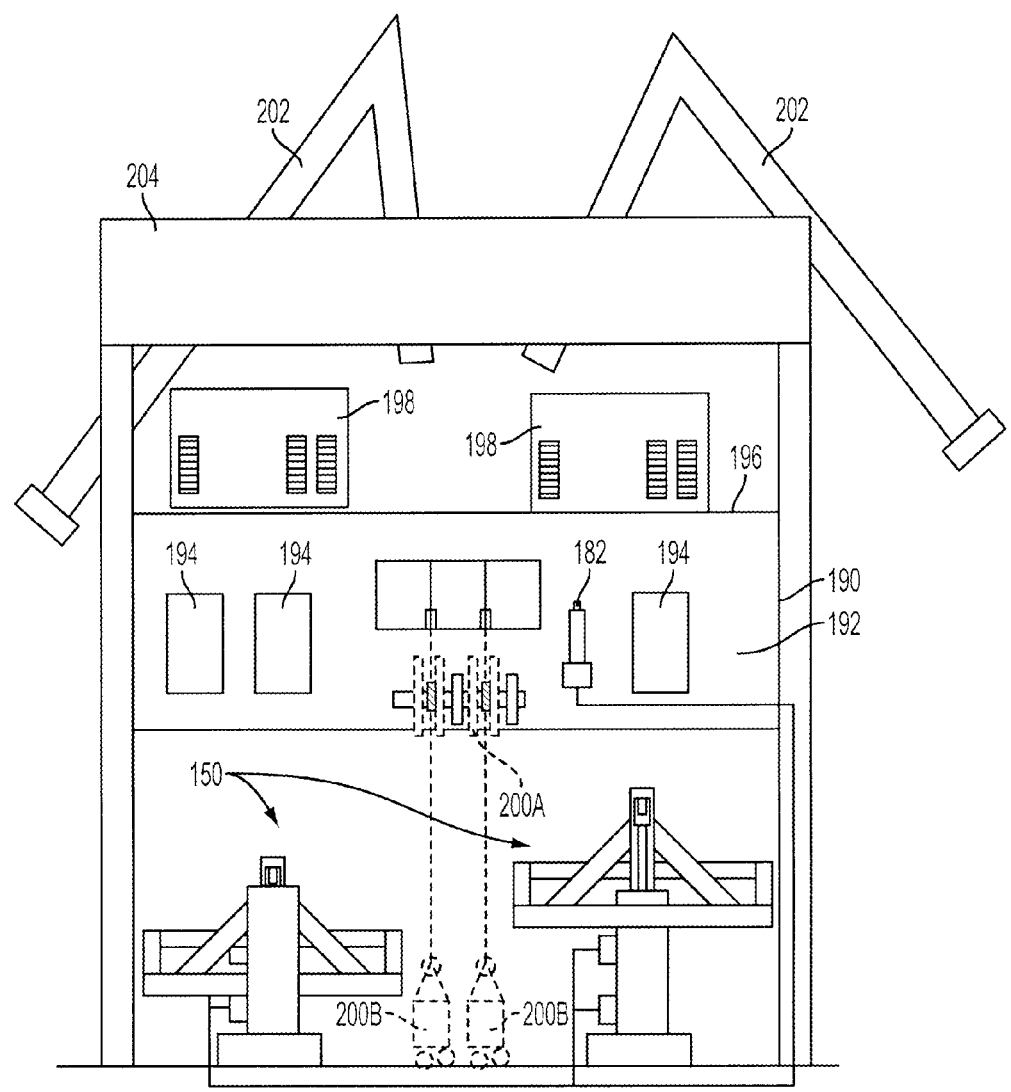
FIG. 11 is a schematic illustration of an exemplary rack, conveyors and tooling for a welding station according to various aspects of the present invention.

Referring to FIG. 11, an exemplary schematic arrangement for organizing equipment for a welding station 116 is illustrated. A rack 190 is positioned proximate to the end of the pair of seesaw conveyors 150. The rack 190 includes a face 192 that supports one or more hydraulic pumps 182 to control the tilt of the respective seesaw conveyors 150 as discussed above, one or more control panels 194 and any other miscellaneous controls, power supplies, electrical outlets, etc.

On top of the face 192 as shown is a shelf 196 that supports two welding machines 198. The welding machines 198 are positioned high enough on the shelf 196 that they are out of the way and do not inhibit movement of the station operators and others who perform work operations in the corresponding welding station 116. The welding machines 198 may be fed from corresponding spools of wire 200A, which are supported by the face 192. The spools 200A may be positioned in a convenient and ergonomic position, e.g., lower than the welding machines 198 so that they can be easily reached by a typical operator. For example, the spools 200A may be positioned low enough for easy loading and unloading, such as where the weight of the spools 200A is a factor. Moreover, by positioning the spools 200A on the face 192 of the rack 190, the spools 200A are positioned in a convenient access position for changeover, but are located out of the work area when welding, thus resulting in a clean and efficient work environment. Alternatively, to reduce the frequency of wire changeover, weld wire may be provided in relatively large boxes of wire 200B. A box of welding wire may weigh several hundred pounds and may thus be provided on a roller/dolly arrangement to facilitate movement of the boxes of wire 200B into position for use.

Extending from the top portion from the rack 190 is a pair of ducts 202 coupled to, and extending from an extractor 204 for controlled airflow. The ducts 202 may include any number of joints, bends, flexible routing, etc., to address the needs of the work environment. Moreover, airflow through the ducts 202 and/or extractor 204 may pass through appropriate filters and other treatments as the particular application dictates. For example, in a welding operation, the extractor 204 and corresponding ducts 202 may be configured for fume and smoke extraction. The extractor 204 may also be coupled, e.g., via suitable duct work, not shown, to remove the smoke and fumes to a remote location.

Accordingly, the single rack 190 supports the hydraulics and controls and/or other suitable drive technologies for powering/controlling the tilt of the conveyors 150, stores the welding machines 198 out of the workspace, positions the wire spools 200 in an ergonomically accessible position, and supports the necessary ducts 202 and associated technologies. Depending upon the technology implemented at the corresponding station, the rack 190 may also be used to store work implement consumables, such as wire, rods, and utilities that supply the welding station.

Figure 12:
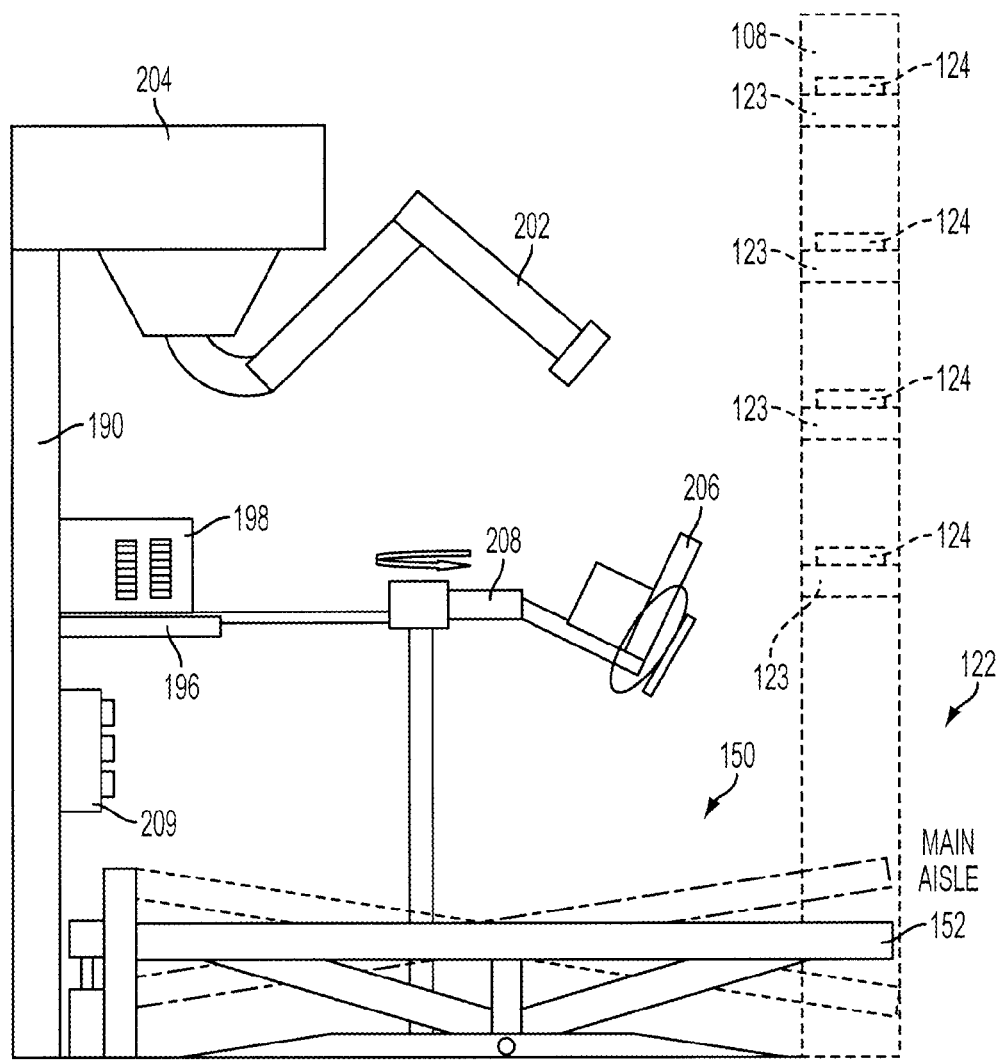
FIG. 12 is a schematic side view of the arrangement shown in FIG. 11 according to various aspects of the present invention.

Referring to FIG. 12, a schematic side view of the system of FIG. 11 is illustrated. In FIG. 12, the storage unit 108 located above the station-aisle interface 122 of the corresponding welding station 116 is shown in phantom lines to better illustrate the relative orientation of the features of the welding station 116. The ducts 202 may be positioned by an operator in the welding station 116 so as to provide airflow for fume and smoke removal at any desired location. For example, using swivels, joints and other suitable configuring devices, the ducts 202 may be positioned for extraction of welding fumes by positioning the ducts 202 at appropriate locations.

Moreover, welding implements 206, which may include, for example, the torch, welding controls/interface, etc., are coupled to the wire spools and corresponding welding machines 198 and are mounted on a boom 208 that allows the welding equipment to be readily positioned at a desired work location by a station operator working in the corresponding welding station 116. For example, the welding boom 208 may be able to swivel, rotate, traverse up/down, in/out, etc., to position the welding implements 206 in any desired working position. Also, as shown, an indicator control 209 is shown on the inside face of the rack 190. The indicator control 209 provides the necessary controls, such as buttons, switches, etc., for operating the indicator 130 associated with that station 102. The indicator control 209 can be positioned in any practical location, such as where it may be convenient for an operator to access and manipulate the indicator control 209 to set the appropriate status of the indicator 130 associated with that station 102 described in greater detail herein.

Figure 13A:
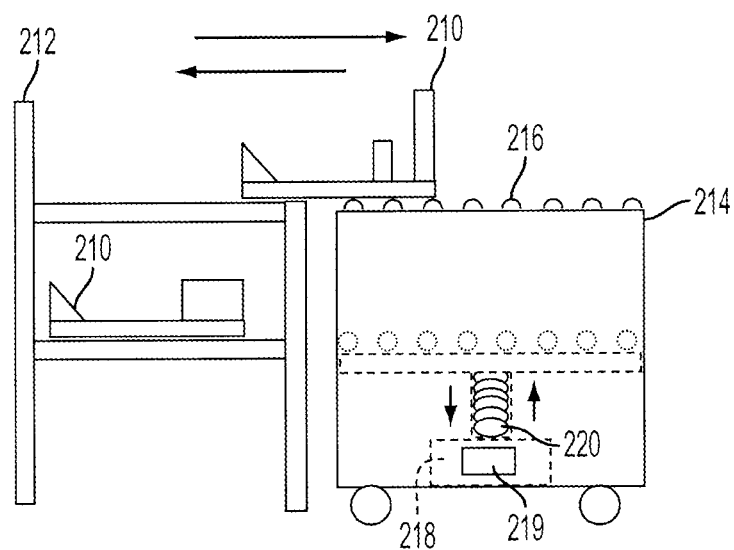
FIG. 13A is a schematic illustration of an exemplary table arrangement having a surface suitable for transferring objects from a corresponding storage location according to various aspects of the present invention.

Referring to FIG. 13A, fixtures 210, may be stored in the welding stations 116, e.g., on work implement racks 212, and may be conveniently accessed and changed out. The fixtures 210 may be used for clamping, aligning, and/or fixturing parts to be welded in a work area of the welding station 116 and may include, for example, corresponding hold-down dogs, bolt-down arm clamps, tapered pins, bending posts, clamps, riser blocks and other accessories, which are used to hold parts of a composite part (weldment) in place for making the weldment. A single work implement rack 212 and corresponding fixture 210 is illustrated for purposes of clarity. However, any number of fixtures 210, work implement racks 212, etc., may be stored in each welding station 116.

As shown, a fixture 210 may be relocated from its storage location on a corresponding work implement rack 212 onto a table 214 for use within the welding station 116. Each moveable table 214 that is located in the welding stations 116 may have, for example, a roller conveyor as a tabletop 216 and each fixture 210 may have, for example, a bottom surface that facilitates movement along the rollers of the table 214 for transfer from its position on a work implement rack 212 to the table 214. The table 214 may also include a height adjusting device 218, e.g., a hydraulic lift that allows the height of the table top to be adjusted to accommodate the height of various storage shelves on the work implement racks 212 and for orienting the fixture 210 to an appropriate height for performing the required welding operations. For example, a foot operated pedal 219 may be used to raise/lower a lift cylinder 220 coupled to the underside of the table top. The table 214 may also include casters or other suitable devices that allow the table 214 to be easily repositioned to facilitate movement of the fixture 210 from the work implement rack 212 to a work area within the welding station 116. Still further, large and heavy fixtures may be permanently fixed to a dedicated moveable table 214 rather than being stored on a work implement rack 212.

Thus, when a fixture 210 is needed, the operator rolls a moveable table 214 parallel to the work implement rack 212 at the location of the desired fixture 210 and rolls the fixture 210 onto the table 214. For movement of the fixture 210, it may be pinned or otherwise secured to the table 214. The table 214 and corresponding fixture 210 can then be transported to an appropriate work area.

Figure 13B:
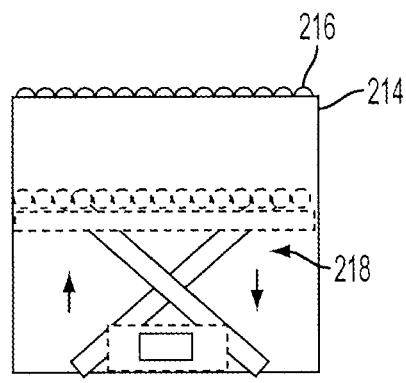
FIG. 13B is a schematic illustration of an exemplary table arrangement having a scissors-style lifting arrangement to selectively raise and lower a table surface according to various aspects of the present invention.

Referring to FIG. 13B, an alternative arrangement of a lifting table 214 is illustrated. The table 214 shown in FIG. 13B does not have casters and is provided in a fixed location, e.g., as part of the cross conveyor 132C in a press brake station 114. As shown, the table top may include a plurality of bearings as an alternative to cylindrical rollers. Also as shown, the height adjusting device 218 is implemented as a scissors-lifting arrangement, which may be utilized where the anticipated load is relatively heavy.

Figure 14:
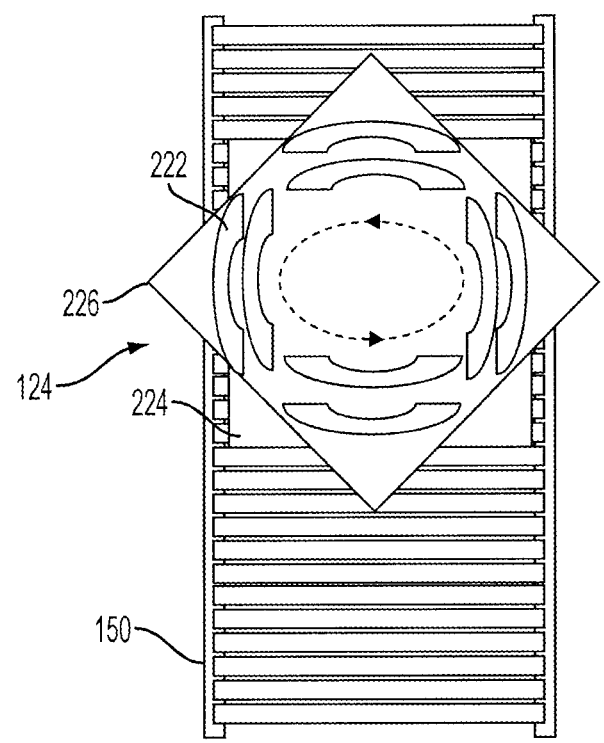
FIG. 14 is a schematic illustration of an exemplary container having a carousel according to an aspect of the present invention.

Referring to FIG. 14, certain stock items on a container 124 may be large, heavy, awkward or otherwise inconvenient to transfer from the conveyor 150 to a corresponding work surface within the station 102. For example, a stock item 222 such as a part for a door or cover may be heavy and large. Accordingly, the container 124 may comprise a carousel container. For example, as shown, the container 124 includes a base portion 224 and a corresponding rotating carousel 226. As such, an operator can remove all of the stock items 222 (8 as shown) from one side of the conveyor 150 simply by rotating the carousel 226. During transportation, the carousel 226 may lock, e.g., using a locking pin, to the base portion 224 to prevent rotation thereof.

Figure 15:
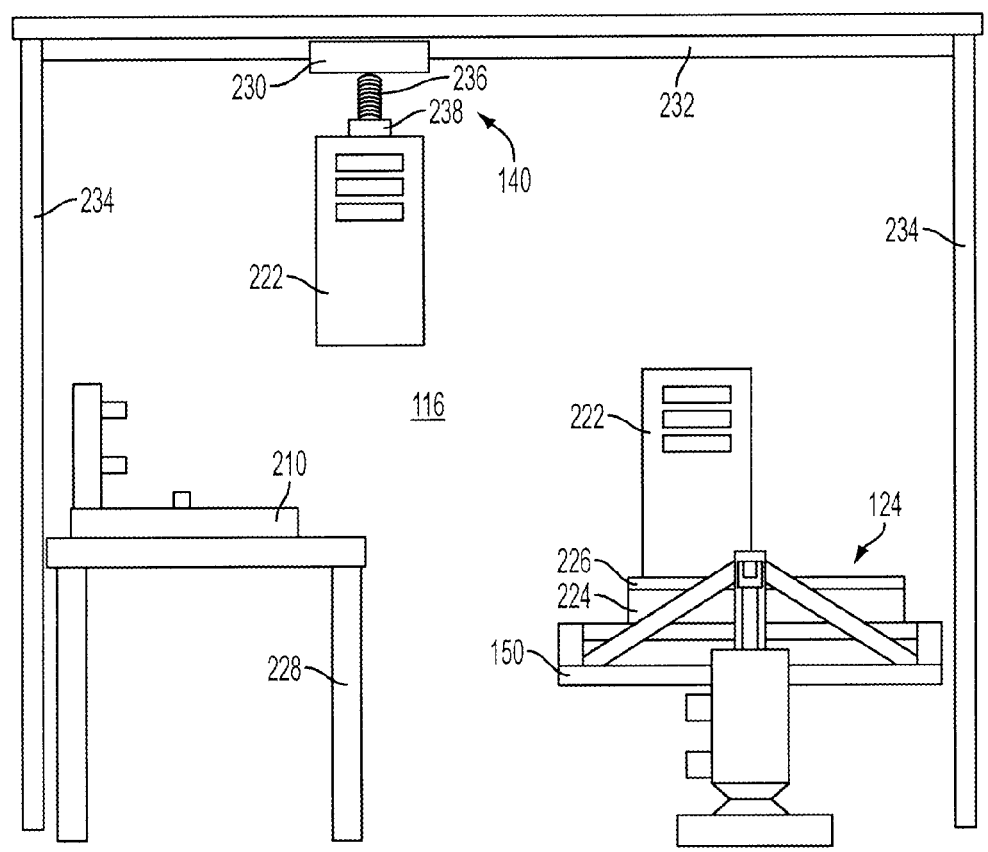
FIG. 15 is a schematic illustration of an exemplary station illustrating a manipulator useful for moving objects between a conveyor and work area according to an aspect of the present invention.

With reference to FIG. 15, another example of a container 124 is illustrated as being received at a welding station 116. Parts of the welding station 116, such as the rack 190, and corresponding features previously discussed have been removed for clarity. The stock items 222, e.g., large covers, would be cumbersome to manually lift off the conveyor 150 for positioning onto a suitable fixture 210 such as a welding jig that has been previously positioned on a table 228. Thus, the welding station 116 is equipped with a manipulator 140. As shown, the manipulator 140 is a hoist that allows an operator to lift and move objects within the station 116 so that they can be properly positioned.

For example, the hoist includes a transport 230 that can be controlled to traverse across a lateral support 232. The lateral support 232 is coupled to posts 234 and may itself be controlled to traverse in an orthogonal (into and out of the page as shown) direction. As such, the transport 230 can be moved anywhere within a horizontal, two dimensional grid which is bounded by the span of the lateral support 232 and the positioning of the posts 234. To lift and lower objects in a vertical direction, the hoist includes a linkage 236 that can extend and retract vertically with respect to the transport 230 and a corresponding connector 238 that allows the hoist to attach to objects to be moved. The positioning of the transport 230 may be manually or electronically controlled. Using the hoist, the operator can quickly reposition heavy objects within the station with minimal effort.

As illustrated, one of the press brake stations and seven of the welding stations have overhead manipulators 140 such as light duty overhead cranes to facilitate the manufacture of heavy parts with reduced exertion on the part of the welding station operators and assistants if needed. However, in practice, the use and location of overhead manipulator(s) 140 within the manufacturing cell 100 may be determined by the nature of the work being performed at each station 102.

Grinding Stations

Figure 16:
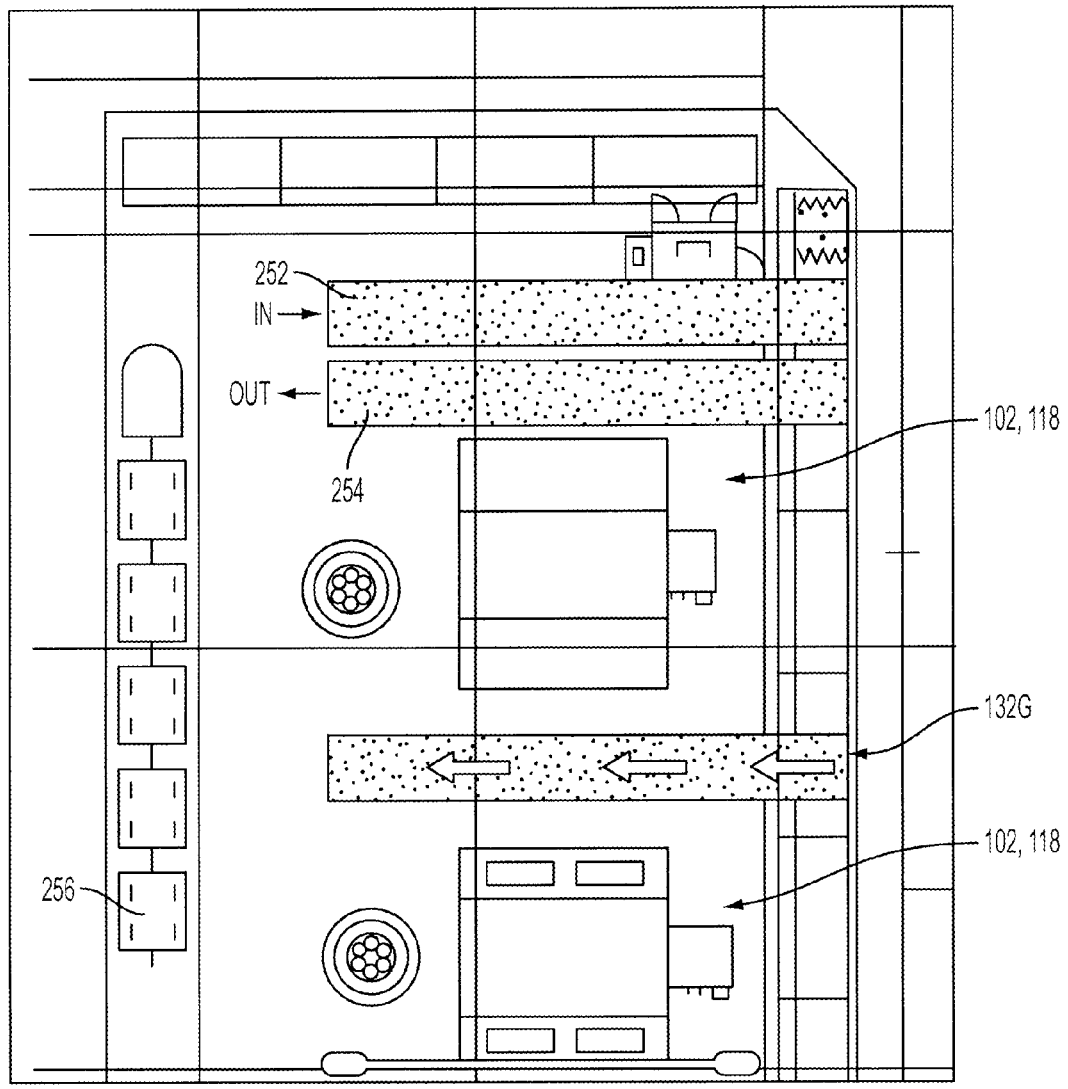
FIG. 16 is a schematic illustration of two stations, a cell inbound conveyor and an outbound conveyor according to an aspect of the present invention.

Referring to FIG. 16, after weldments have been completed at one of the welding stations 116, the weldments may be placed on containers that may be transported, e.g., via the forklift truck 106 to a grinding station 118 for appropriate grinding and finishing work. The two grinding stations 118 share a single conveyor 132G and operate, e.g., in a FIFO manner substantially as described in greater detail herein. In the illustrated implementation of the manufacturing cell 100, the grinding station 118 output is staged for exiting the manufacturing cell 100. In an analogous manner to the other stations 102, all work implements, including tools, grinding wheels, etc., are stored at the grinding stations 118.

Miscellaneous Considerations

The manufacturing cell 100 may also include a dedicated inbound conveyor 252 and/or a dedicated outbound conveyor 254. The inbound conveyor 252 may be used to bring stock materials, raw materials, supplies and other needed objects into the manufacturing cell 100 from an external source. Likewise, the outbound conveyor 254 may be used to remove containers from the manufacturing cell 100 so that they can be transported to the next process. For example, transport containers 124B, e.g., containers for parts manufactured in the cell 100 that are to be removed from the manufacturing cell 100, may enter the cell via the inbound conveyor 252 for replenishment. In an exemplary implementation, the output from the grinding stations 118 comprises parts on transport containers 124B that are placed on the outbound conveyor 254 for use outside the manufacturing cell 100.

According to an aspect of the present invention, when a cell container 124A is moved to the outbound conveyor 254, a label that was temporarily attached to the cell container 124A is removed, thus sending a generic container 124 outside the manufacturing cell 100. The removed tag may be maintained to track replenishment as is described in greater detail herein.

The inbound conveyor 252 may be used to return transport containers 124B to the manufacturing cell 100 for replenishment. When a transport container 124B (container holding product produced within the cell 100 for use by a down stream process external to the manufacturing cell 100, e.g., a customer) is emptied and returned to the manufacturing cell 100 for replenishment, the transport container 124B may include a shop order, or a shop order may be otherwise associated with the returned transport container 124B, such as via an electronic system to identify the stock to be replenished. However, very large transport containers 124B may be delivered to the manufacturing cell 100 at a separate receiving location and other arrangements may be implemented.

The containers 124 loaded onto the outbound conveyor 254 may be moved to a subsequent area, e.g., an outbound train 256, which includes a plurality of container storage spaces that can be towed away from the manufacturing cell 100. As such, an operator can periodically haul the outbound train 256 away for appropriate relocating of the containers loaded thereon. As an example, a grinding operation may be the last operation performed by the manufacturing cell 100 on a given customer item. As such, a container 124 that leaves the grinding station may exit to the outbound train 256.

Each station 102 may include containers including bins, buckets and the like as well as other small parts storage areas within the station for convenient access to commonly used parts that do not need to be stored on a container 124, including consumables such as paper forms and tags, supplies such as welding tips, etc. In this regard, the small parts storage containers may be placed on an outbound conveyor of the corresponding station 102 to designate that a replenishment operation is necessary. Moreover, an indicator may be used to designate that tools or other work implements have been removed from their assigned storage locations. For example, a green placard, light or other indicia can indicate that all tools are appropriately stored. A red placard, light or other indicia can indicate that a tool has been removed from its assigned storage location.

As noted in the examples above, when a cell container 124A is emptied, e.g., when a cell container 124A holding component parts that are used up in a welding operation is returned from a work area of a welding station 116 to the corresponding station-aisle interface 122 for put away, a replenishment operation is performed. In this regard, it may be that certain operations may be required outside of the cell to implement the replenishment function. For example, the stock items may need to be laser cut, or the stock items may need to be purchased, formed, fabricated or otherwise acquired. In this regard, a label 258 associated with the emptied cell container 124A may be scanned to trigger an automatic replenishment workflow and corresponding replenishment order. Alternatively, a manually generated replenishment order may be created to trigger a process outside the manufacturing cell 100 for the required stock items.

Figure 17:
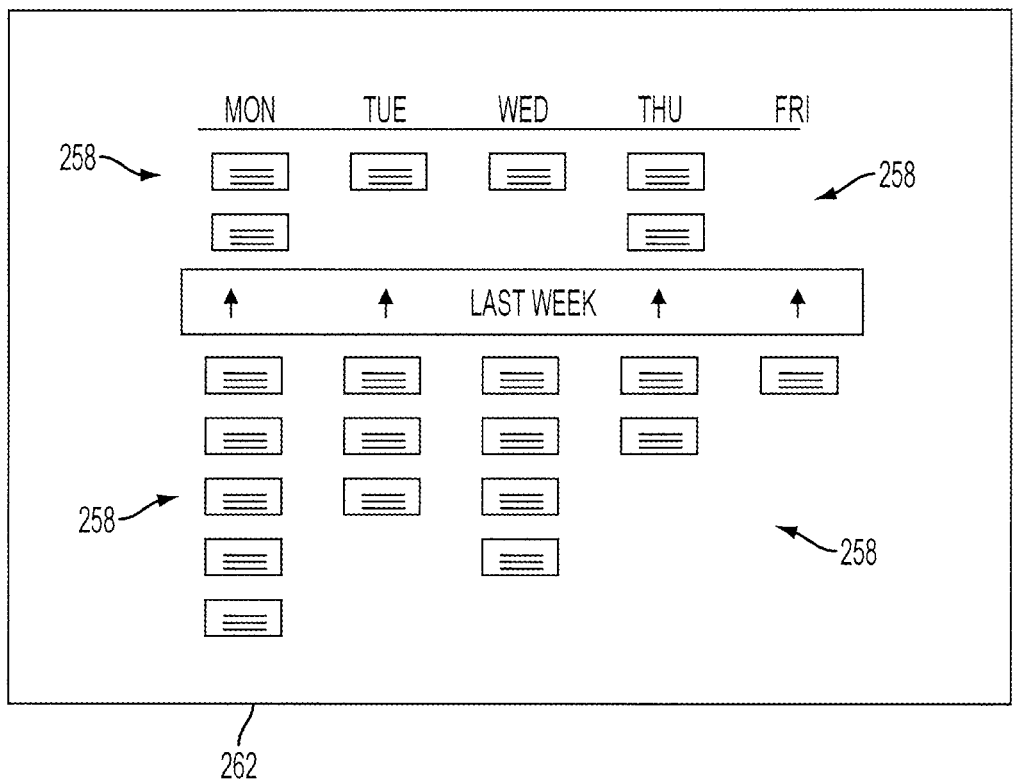
FIG. 17 is a schematic illustration of a board for monitoring emptied containers according to an aspect of the present invention.

Referring to FIG. 17, until the necessary items are available, e.g., as indicated by receiving the stock items on the inbound conveyor 252, the label 258 is removed from the corresponding empty container 124 and that label, or information corresponding to that label is stored on a stock board 262 along with other labels 258. For example, the stock board 262 may hold the magnetic labels described above with reference to FIG. 2. Alternatively, the stock board 262 can take other forms including an electronic form. The container, now having its label removed, can be stored in a recycle location within the manufacturing cell 100. As shown, the labels 128 are organized by day of the week, and labels 128 that have been on the board 262 for over a week are distinguished.

When a stock item is received into the manufacturing cell 100, e.g., via the inbound conveyor 252, the inbound container will include a shop order associated therewith. The shop order is matched to a corresponding label 258 on the board 262. That label 258 is removed from the stock board 262 and is attached to the cell container 124A received from the inbound lane, e.g., the inbound conveyor 252, and the stock handler puts the replenished contents on the cell container 124A away at a suitable storage unit 108, such as may be designated directly on the label itself, or via other means, such as electronically driven replenishment, as determined by the stock handler, etc.

A visual inspection of the stock board 262 quickly indicates to the shop supervisor, cell manager or other interested party, what items the cell 100 is waiting on from an upstream process.

Exemplary Operation

Figure 18:
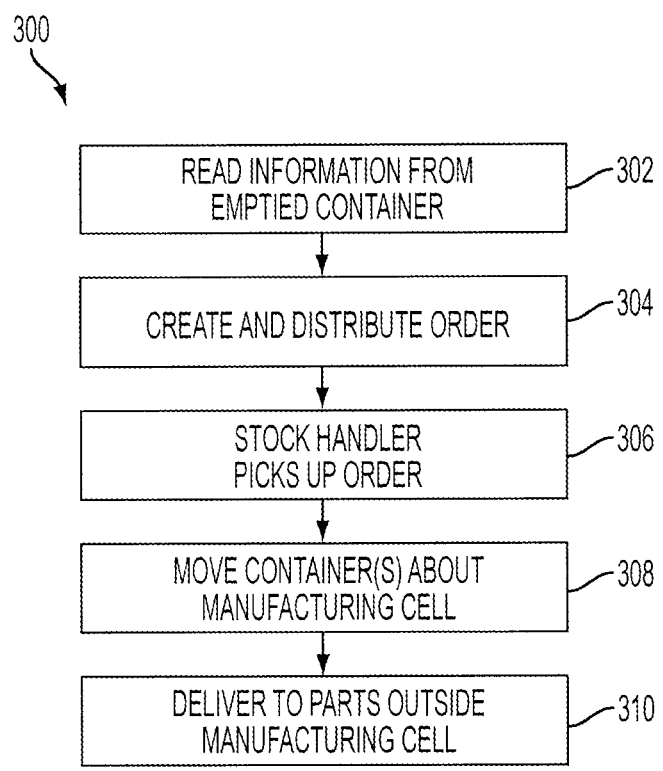
FIG. 18 is a flow chart illustrating an exemplary use of a manufacturing cell according to various aspects of the present invention.

With reference to FIG. 18, as the transport containers 124B are emptied at a downstream process at some location outside the manufacturing cell 100, the tag on the container, i.e., the barcode, label, RFID, memory or other identification/information storing or bearing technology on the container may be correspondingly read, scanned, sensed, etc., at 302. In response to reading the tag, a replenishment order is created for work, at least a portion of which is to be performed at the manufacturing cell 100 and the order is appropriately distributed at 304. For example, the order may be electronically generated and communicated to a desktop computer/printer, such as may be stationed at the management area, i.e., the supervisor or team station 110, of the manufacturing cell 100. Alternatively, the order may be electronically communicated directly to the truck 106, and may be output to a display and/or printer on the truck 106. For example, using a wireless technology, the order may be communicated directly to a wireless printer, display or other suitable processing device on the truck 106. Still further, the order may be communicated to a gating operation upstream of the manufacturing cell 100. Moreover, by electronically generating the order, appropriate data can automatically feed an MRP and/or other manufacturing software, etc.

When the appropriate replenishment materials are located within the manufacturing cell 100, the stock handler operating the truck 106 picks up the order at 306, and moves containers 124 about the manufacturing cell 100 to facilitate manufacturing of the desired parts at 308. When processing within the manufacturing cell 100 is complete, one or more containers 124B, each having one or more parts thereon are delivered outside the manufacturing cell 100, e.g., to the outbound conveyor 254 or other suitable location for use of the parts outside of the manufacturing cell 100.

For example, to manufacture a door for a materials handling vehicle, the stock handler may deliver a cell container 124A containing door blanks and an empty transport container 124B to an inbound conveyor at a station-aisle interface of a designated one of the press brake stations. The press brake station operator forms the door blanks to a desired shape and relocates the formed doors to the transport container 124B. The cell container 124A is recycled and the transport container 124B, now holding the shaped door blanks, is moved to the outbound conveyor.

The stock handler picks up the transport container 124B at the station-aisle interface of the press brake station and delivers the container 124B to an inbound conveyor, e.g., a seesaw conveyor oriented for inbound operation, at a station-aisle interface of a welding station. The stock handler may also retrieve one or more cell containers 124A that hold components to be welded to the shaped door blanks from various storage locations about the manufacturing cell, which are also delivered to the inbound conveyor of the welding station.

When the welding operation is complete, all containers are delivered back to the station-aisle interface, e.g., by orienting the seesaw conveyor for outbound conveyance. If a cell container 124A is returned empty, a replenishment operation is triggered to replace those consumed components. Otherwise, the cell containers 124A are returned to storage locations within the manufacturing cell.

The transport container 124B, which now holds one or more formed and welded doors, is either relocated to an outbound conveyor of the manufacturing cell, or it is delivered to the conveyor at the station-aisle interface of the grinding stations for finishing work. After the grinding operations are complete, the transport container 124B is moved to the manufacturing cell outbound conveyor so that the doors may be used in a downstream process outside of the manufacturing cell.

Depending upon the workload and number of active stations in the cell, station operators may move about from one station to another, such as depending upon the particular component(s) to be manufactured/assembled. Alternatively, station operators can quickly change over stations for production of different parts. In this regard, a labor calculator and/or other management tools may be utilized to calculate the labor needs within the manufacturing cell 100, and to predict station operator requirements based upon production, assembly, service requirements, etc.

Figure 19:
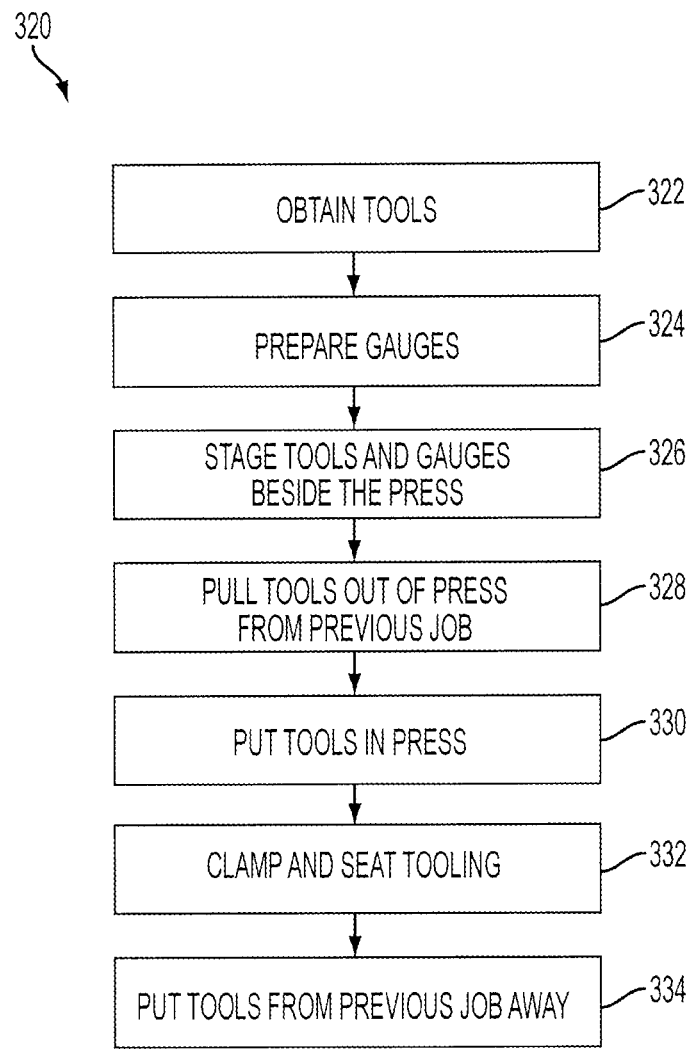
FIG. 19 is a flow chart illustrating exemplary activities performed by a production tender as part of a die changeover at a press brake station according to various aspects of the present invention.

Each press brake station 114 may be required to produce multiple parts for one or more product lines both for the cell and for other manufacturing operations outside the cell. In order to enable a variety of parts to efficiently flow through the press brake stations 114, a quick die change procedure is illustrated in the flow charts of FIGS. 19 and 20. Each actively working press brake station may be operated by a production tender and a primary operator. In this regard, a single tender may service, for example, all actively running press brake stations. The tender's responsibility includes assisting the primary operator during a die changeover. The flow chart of FIG. 19 provides an exemplary method 320 that organizes the tender's actions so that all tooling and gauging that is required to run a job is ready to go before the changeover is to take place, i.e., pre-changeover activity.

The tender obtains the tools at 322 and prepares necessary gauges at 324. The tender then stages the retrieved tools and gauges in an appropriate location, e.g., beside the corresponding press brake at 326. The tender then pulls the tools from the previous job out from the press at 328 and puts the newly obtained tools in the press at 330. The tender clamps and seats the tooling at 332 and puts the previously used tools away at 334.

Figure 20:
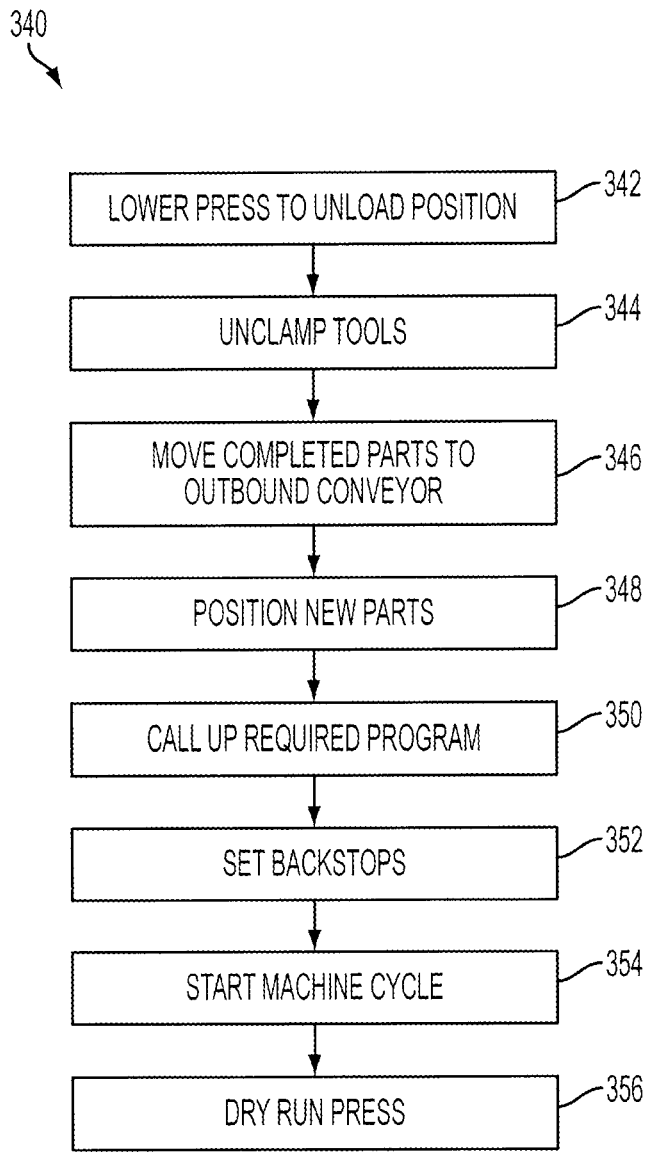
FIG. 20 is a flow chart illustrating exemplary activities performed by a primary operator as part of a die changeover at a press brake station according to various aspects of the present invention.

With reference to FIG. 20, a method 340 illustrates an exemplary standard work procedure for a changeover for the primary operator. The primary operator lowers the press to an unload position at 342 and tools are unclamped at 344. The primary operator moves the completed parts to the outbound conveyor at 346 and new parts are positioned with respect to the die at 348. The correct program is called up on the press brake at 350 and the backstops are set at 352. The press brake machine cycle is started at 354 and a dry run press is executed at 356.

The press changeover procedure may be handled differently, depending upon the application, e.g., due to the size of the required tools. For heavier tools, the tool sets may be equipped with an air bearing to easily load and unload the large tools. The air bearing may comprise a specially designed bottom plate on the tool that will float the tool on a cushion of air. The large tooling is stored on a table to allow the tool to float in the press without requiring strenuous lifting as described more fully herein.

The flowchart and block diagrams in the figures illustrate the architecture, functionality, and operation of possible implementations of systems and methods according to various embodiments of the present invention. In some alternative implementations, the operations noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method of manufacturing parts using a manufacturing cell comprises:

storing components to be used during manufacture on cell containers;

storing said cell containers in storage units that are located along a main aisle in cooperation with a plurality of stations arranged in two rows such that said main aisle passes between said two rows, wherein each of said plurality of stations has a station-aisle interface that provides an interaction area to said main aisle and is configured such that a corresponding station operator is capable of performing a predefined function associated with said manufacturing cell;

receiving an order to manufacture a part;

using a guided forklift truck to traverse said main aisle without requiring steering control of a stock handler operating said forklift truck to relocate said cell containers from said storage units to designated ones of said plurality of station-aisle interfaces to trigger inbound workflows to at least one of said plurality of stations according to said order; and removing containers from said designated ones of said plurality of station-aisle interfaces when work is completed at said corresponding ones of said plurality of stations, wherein at least one of said plurality of stations comprises:

two conveyors, each having an end proximate to said station-aisle interface, wherein each conveyor has a platform that is tiltable such that when said conveyor is tilted in a first position, a container delivered by said forklift truck from said aisle to said platform is biased by gravity to move toward said station work area; and when said conveyor is tilted to a second position, a container delivered from said station work area to said platform is biased by gravity to move toward said aisle for pickup by said forklift truck so that each of said two conveyors can be used to receive and return containers between said station work area and the station-aisle interface.

2. The method according to claim 1, further comprising:

distinguishing between cell containers that hold components for use within said manufacturing cell and transport containers that are used to store parts manufactured within said manufacturing cell and which are delivered for use outside of said manufacturing cell.

3. The method according to claim 2, further comprising:

reading information from a transport container that has been emptied during a process that is downstream and outside of said manufacturing cell;

creating an order to replenish stock similar to stock that was associated with said emptied transport container for replenishment from said manufacturing cell;

communicating said order to the stock handler operating the guided forklift truck within said cell;

utilizing said guided forklift truck to traverse said aisle to pull one or more cell containers for delivery to at least one assigned station within said cell for work thereon;

manufacturing replenishment stock based on said order that is stored on a new transport container; and delivering said replenishment stock on said new transport container from said manufacturing cell to a subsequent process.

4. The method according to claim 3, wherein at least one of said plurality of stations comprises a press brake station and said method includes changeover activity for said press brake station preformed by a production tender comprising:

obtaining necessary work implements associated with a new part to be processed;

preparing necessary gauges for setting up a corresponding brake press;

staging work implements and gauges relative to the corresponding brake press;

pulling tools out of said corresponding brake press from a previous job if necessary;

putting new tools in said corresponding brake press;

clamping and seating said new tools in said corresponding brake press; and putting tools used from previous job away within said press brake station.

5. The method according to claim 4, wherein said method includes changeover activity for said press brake station performed by a press operator comprising:

lowering said corresponding press brake to an unload position;

unclamping said tools in said corresponding press brake;

moving completed parts to an outbound conveyor associated with said press brake station;

positioning new parts in a die associated with said corresponding press brake;

calling up a required program on said corresponding press brake;

setting backstops of said corresponding press brake;

starting a machine cycle of said corresponding press brake; and executing a dry run press operation of said corresponding press brake.

6. The method according to claim 1, further comprising generating a replenishment operation when said stock handler picks up an empty one of said cell containers from a station by:

using said guided forklift truck to deliver said empty one of said cell containers to a designated area;

removing a detachable tag from said empty one of said cell containers; and triggering a gating operation to replenish the contents of said empty one of said cell containers.

7. The method according to claim 6, further comprising:

storing said detachable tag which was removed from said empty one of said cell containers on a stock board that is visible from said manufacturing cell.

8. The method according to claim 7, further comprising:

receiving a replenishment cell container on an inbound conveyor of said manufacturing cell;

installing said detachable tag onto said replenishment cell container;

picking up said replenishment cell container with said guided forklift truck; and returning said replenishment cell container to a suitable storage unit.

9. The method according to claim 1, further comprising:

enabling a visual indicator located at a position that is visible to said stock handler operating said guided forklift truck to indicate the status of a corresponding station.

10. The method according to claim 9, wherein said visual indicator is located at a position that is visible to said stock handler operating said guided forklift truck to indicate the status of a corresponding station further comprises:

setting said indicator to a first color to indicate that a corresponding station is busy operating, and setting said indicator to a second color to indicate that said corresponding station is in need of said stock handler.

11. The method according to claim 9, further comprising:
positioning said indicator along said main aisle adjacent to a corresponding station-aisle interface of each station.

12. The method according to claim 1, wherein said storing said cell containers in storage units that are located along a main aisle in cooperation with a plurality of stations comprises:
configuring a storage unit as at least one rack above said station-aisle interface of a corresponding station;
wherein said storing said cell containers in storage units that are located along a main aisle further comprises storing at least one cell container that has components associated with a function assigned to said corresponding station on said at least one rack above said station-aisle interface.

13. The method according to claim 12, further comprising:
assigning container tags to each cell container by:
identifying the contents of the cell container;
specifying a location to store said cell container; and
specifying how to replenish said cell container.

14. A method of manufacturing parts using a manufacturing cell comprises:
laying out said cell to have a main aisle and a plurality of stations arranged in two rows such that said main aisle passes between said two rows;
configuring each of said plurality of stations to have a station-aisle interface that provides an interface area to said main aisle so that a corresponding station operator is capable of performing a predefined function associated with said manufacturing cell at a station work area;
locating a plurality of storage units within said cell along said main aisle, each storage unit dimensioned to store at least one cell container that holds one or more components associated with work flowing through said cell;
using a guided forklift truck to traverse said main aisle without requiring steering control of a stock handler operating said forklift truck to relocate cell containers from said storage units to designated ones of said station-aisle interfaces to trigger inbound workflows to corresponding ones of said plurality of stations, and to remove containers from said designated ones of said plurality of station-aisle interfaces when work is completed at said corresponding ones of said plurality of stations;
using two conveyors each having a platform that is tiltable in at least one of said plurality of stations;
configuring each of said conveyors to have an end proximate to said station-aisle interface in said at least one of said plurality of stations;
tilting either of said conveyors to a first position causes a container delivered by said forklift truck from said aisle to said platform to be biased by gravity to move toward said station work area; and
tilting either of said conveyors to a second position causes a container delivered from said station work area to said platform to be biased by gravity to move toward said aisle for pickup by said forklift truck so that each of said two conveyors can be used to receive and return containers between said station work area and the station-aisle interface.

15. The method according to claim 14, further comprising generating a replenishment operation when said stock handler picks up an empty one of said cell containers from a station by:
using said guided forklift truck to deliver said empty one of said cell containers to a designated area;
removing a detachable tag from said empty one of said cell containers; and
triggering a gating operation to replenish the contents of said empty one of said cell containers.

16. The method according to claim 15, further comprising:
storing said detachable tag which was removed from said empty cell container on a stock board that is visible from said manufacturing cell.

17. The method according to claim 16, further comprising:
receiving a replenishment cell container on an inbound conveyor of said manufacturing cell;
installing said detachable tag onto said replenishment cell container;
picking up said replenishment cell container with said guided forklift truck; and
returning said replenishment cell container to a suitable storage unit.

18. The method according to claim 14, further comprising:
distinguishing between cell containers that hold components for use within said manufacturing cell and transport containers that are used to store parts manufactured within said manufacturing cell and which are delivered for use outside of said manufacturing cell.

19. The method according to claim 18, further comprising:
reading information from a transport container that has been emptied during a process that is downstream and outside of said manufacturing cell;
creating an order to replenish stock similar to stock that was associated with said emptied transport container for replenishment from said manufacturing cell;
communicating said order to the stock handler operating the guided forklift truck within said cell;
utilizing said guided forklift truck to traverse said aisle to pull one or more cell containers for delivery to at least one assigned station within said cell for work thereon;
manufacturing replenishment stock based on said order that is stored on a new transport container; and
delivering said replenishment stock on said new transport container from said manufacturing cell to a subsequent process.

20. The method according to claim 14 further comprising:
configuring one of said plurality of storage units as at least one rack above said station-aisle interface of a corresponding station; and
storing at least one cell container that has components associated with a function assigned to said corresponding station on said at least one rack above said station-aisle interface.

* * * * *